US008922852B2

(12) United States Patent
Imai

(10) Patent No.: US 8,922,852 B2

(45) Date of Patent: Dec. 30, 2014

(54) DEVICE FOR DRIVING RECORDING HEAD AND RECORDING APPARATUS

(75) Inventor: Koji Imai, Inuyama (JP)

(73) Assignee: Brother Kogyo Kabushiki Kaisha, Nagoya-shi, Aichi-Ken (JP)

( * ) Notice: Subject to any disclaimer, the term of this patent is extended or adjusted under 35 U.S.C. 154(b) by 2020 days.

(21) Appl. No.: 11/056,750

(22) Filed: Feb. 11, 2005

(65) Prior Publication Data

US 2005/0204365 A1 Sep. 15, 2005

(30) Foreign Application Priority Data

Feb. 12, 2004 (JP) ................................ 2004-034333

(51) Int. Cl.

| | |
|---|---|
| ***H04N 1/46*** | (2006.01) |
| ***B41J 2/01*** | (2006.01) |
| ***B41J 29/38*** | (2006.01) |
| ***B41J 2/015*** | (2006.01) |
| ***B41J 2/14*** | (2006.01) |
| ***B41J 2/16*** | (2006.01) |
| ***B41J 2/045*** | (2006.01) |

(52) U.S. Cl.

CPC .......... *B41J 2/04536* (2013.01); *B41J 2/04541* (2013.01); *B41J 2/0458* (2013.01); *B41J 2/04581* (2013.01); *B41J 2/04588* (2013.01); *B41J 2/04595* (2013.01); *B41J 2002/14419* (2013.01)

USPC .................. 358/502; 347/1; 347/10; 347/11; 347/12; 347/20; 347/50

(58) Field of Classification Search

None

See application file for complete search history.

(56) References Cited

U.S. PATENT DOCUMENTS

| | | | | |
|---|---|---|---|---|
| 4,825,389 | A * | 4/1989 | Masaki | 358/1.8 |
| 5,974,231 | A * | 10/1999 | Arakawa et al. | 358/1.9 |
| 6,009,245 | A * | 12/1999 | Kato et al. | 358/1.17 |
| 6,193,346 | B1 | 2/2001 | Nakano | |
| 6,280,012 | B1 * | 8/2001 | Schloeman et al. | 347/12 |
| 6,530,639 | B1 * | 3/2003 | Matsuda | 347/15 |
| 6,932,452 | B2 * | 8/2005 | Nou | 347/10 |
| 2002/0054311 | A1 * | 5/2002 | Kubo | 358/1.13 |
| 2002/0093544 | A1 * | 7/2002 | Schloeman et al. | 347/10 |
| 2003/0122885 | A1 | 7/2003 | Kobayashi | |
| 2004/0119781 | A1 * | 6/2004 | Szumla | 347/50 |

FOREIGN PATENT DOCUMENTS

| | | |
|---|---|---|
| JP | 10-006534 | 1/1998 |
| JP | 11-058710 | 3/1999 |
| JP | 2000-158643 | 6/2000 |
| JP | 2003-251806 | 9/2003 |

* cited by examiner

*Primary Examiner* — Fan Zhang

(74) *Attorney, Agent, or Firm* — Frommer Lawrence & Haug LLP

(57) ABSTRACT

A device for driving a recording head comprises select data input elements, a waveform signal selector, and a drive signal supplier. To the select data input elements, select data sets corresponding to recording elements included in the recording head are inputted in a serial manner. Each one of the select data sets indicates which one among waveform signals is to be employed for a corresponding recording element in a single printing cycle. The waveform signal selector selects, for each of the recording elements, one among the waveform signals on the basis of a corresponding one among the select data sets inputted to the select data input. The drive signal supplier supplies, based on the selected waveform signal, a drive signal to each of the recording elements. The number of the select data input elements is greater than the number of bits included in each of the select data sets. The number of signal lines through which the select data sets are inputted to the select data input elements in a serial manner is the same as the number of the select data input elements.

8 Claims, 21 Drawing Sheets

| pixel data set | | ink ejection amount |
|---|---|---|
| b1 | b0 | |
| 0 | 0 | zero |
| 0 | 1 | small |
| 1 | 0 | middle |
| 1 | 1 | large |

| select data set | | | wave signal |
|---|---|---|---|
| d2 | d1 | d0 | |
| 0 | 0 | 0 | VDD1 |
| 0 | 0 | 1 | FIRE1 |
| 0 | 1 | 0 | FIRE2 |
| 0 | 1 | 1 | FIRE3 |
| 1 | 0 | 1 | FIRE4 |
| 1 | 1 | 0 | FIRE5 |
| 1 | 1 | 1 | FIRE6 |

FIG. 17

| this time | | | last time | | | hysteresis calculation | | select data set | | |
|---|---|---|---|---|---|---|---|---|---|---|
| pixel data set | | ink ejection amount | pixel data set | | ink ejection amount | ink ejection amount | wave signal | | | |
| n1 | n0 | | p1 | p0 | | | | d2 | d1 | d0 |
| 0 | 0 | zero | × | × | irrespective | zero | VDD1 | 0 | 0 | 0 |
| 0 | 1 | small | 0 | 0 | zero | small | FIRE1 | 0 | 0 | 1 |
| 0 | 1 | small | 0 | 1 | small | small | FIRE1 | 0 | 0 | 1 |
| 0 | 1 | small | 1 | 0 | middle | hysteresis small | FIRE4 | 1 | 0 | 1 |
| 0 | 1 | small | 1 | 1 | large | hysteresis small | FIRE4 | 1 | 0 | 1 |
| 1 | 0 | middle | 0 | 0 | zero | middle | FIRE2 | 0 | 1 | 0 |
| 1 | 0 | middle | 0 | 1 | small | middle | FIRE2 | 0 | 1 | 0 |
| 1 | 0 | middle | 1 | 0 | middle | middle | FIRE2 | 0 | 1 | 0 |
| 1 | 0 | middle | 1 | 1 | large | hysteresis middle | FIRE5 | 1 | 1 | 0 |
| 1 | 1 | large | 0 | 0 | zero | large | FIRE3 | 0 | 1 | 1 |
| 1 | 1 | large | 0 | 1 | small | large | FIRE3 | 0 | 1 | 1 |
| 1 | 1 | large | 1 | 0 | middle | large | FIRE3 | 0 | 1 | 1 |
| 1 | 1 | large | 1 | 1 | large | hysteresis large | FIRE6 | 1 | 1 | 1 |

FIG. 20

| CLK number (order of transmission) | SIN-0 | | SIN-1 | | SIN-2 | | SIN-3 | | ink color |
|---|---|---|---|---|---|---|---|---|---|
| | ch number x | d | ch number x | d | ch number x | d | ch number x | d | |
| 1↑ | 75 | 2 | 151 | 2 | 227 | 2 | 303 | 2 | M |
| 2↑ | | 1 | | 1 | | 1 | | 1 | |
| 3↑ | | 0 | | 0 | | 0 | | 0 | |
| 4↑ | 74 | 2 | 150 | 2 | 226 | 2 | 302 | 2 | Bk |
| 5↑ | | 1 | | 1 | | 1 | | 1 | |
| 6↑ | | 0 | | 0 | | 0 | | 0 | |
| 7↑ | 73 | 2 | 149 | 2 | 225 | 2 | 301 | 2 | C |
| 8↑ | | 1 | | 1 | | 1 | | 1 | |
| 9↑ | | 0 | | 0 | | 0 | | 0 | |
| 10↑ | 72 | 2 | 148 | 2 | 224 | 2 | 300 | 2 | Y |
| 11↑ | | 1 | | 1 | | 1 | | 1 | |
| 12↑ | | 0 | | 0 | | 0 | | 0 | |
| 13↑ | 71 | 2 | 147 | 2 | 223 | 2 | 299 | 2 | M |
| 14↑ | | 1 | | 1 | | 1 | | 1 | |
| 15↑ | | 0 | | 0 | | 0 | | 0 | |
| ⋮ | ⋮ | | ⋮ | | ⋮ | | ⋮ | | ⋮ |
| 214↑ | 4 | 2 | 80 | 2 | 154 | 2 | 232 | 2 | Y |
| 215↑ | | 1 | | 1 | | 1 | | 1 | |
| 216↑ | | 0 | | 0 | | 0 | | 0 | |
| 217↑ | 3 | 2 | 79 | 2 | 153 | 2 | 231 | 2 | M |
| 218↑ | | 1 | | 1 | | 1 | | 1 | |
| 219↑ | | 0 | | 0 | | 0 | | 0 | |
| 220↑ | 2 | 2 | 78 | 2 | 152 | 2 | 230 | 2 | Bk |
| 221↑ | | 1 | | 1 | | 1 | | 1 | |
| 222↑ | | 0 | | 0 | | 0 | | 0 | |
| 223↑ | 1 | 2 | 77 | 2 | 151 | 2 | 229 | 2 | C |
| 224↑ | | 1 | | 1 | | 1 | | 1 | |
| 225↑ | | 0 | | 0 | | 0 | | 0 | |
| 226↑ | 0 | 2 | 76 | 2 | 150 | 2 | 228 | 2 | Y |
| 227↑ | | 1 | | 1 | | 1 | | 1 | |
| 228↑ | | 0 | | 0 | | 0 | | 0 | |

DEVICE FOR DRIVING RECORDING HEAD AND RECORDING APPARATUS

BACKGROUND OF THE INVENTION

1. Field of the Invention

The present invention relates to a device for driving a recording head that conducts recordings on a record medium, and also to a recording apparatus.

2. Description of Related Art

Various types are known as a recording head that conducts recording on a record medium. A mentionable example thereof is an ink-jet head that performs printing by ejecting ink through a large number of nozzles. Some ink-jet heads change the amount of ink ejected through the respective nozzles during one printing cycle, to thereby achieve gradation printing.

For example, Japanese Patent Unexamined Publication No. 2000-158643 discloses that transmitted from a main circuit of an ink-jet recording apparatus to a head driver are a plurality of waveform signals that are to be used for performing gradation printing and select data sets that include a predetermined number of bits and correspond to respective nozzles and also to any one of the plurality of waveform signals. In the head driver, a predetermined one of the plurality of waveform signals is selected for every nozzle based on the select data set corresponding to that nozzle. Ink is ejected through the nozzle in accordance with the waveform signal thus selected. In a case where, for example, four waveform signals that correspond to respective four ink-ejection mode (e.g., four cases where the ink ejection amount is zero, small, middle, and large) are transmitted to the head driver, the select data set which is used for selecting, for each nozzle, any one of these four waveform signals is constituted of two-bit data in order to have one-to-one correspondence with the four waveform signals. Here, the ink ejection amount being zero means no ink ejection performed.

In many cases, the number of signal lines through which the select data sets are serially transmitted from the main circuit to the head driver is the same as the number of bits included in the select data set, because it simplifies circuitries. For example, two signal lines are adopted in order to transmit two-bit select data set to the head driver, and three signal lines are adopted in order to transmit three-bit select data set to the head driver.

The number of nozzles has seen a recent trend of considerable increase in order to meet a demand for high-quality and high-speed printings. In addition, there arises a need of increasing the number of waveform signals for the purpose of performing a multi-gradation printing to thereby improve print quality. An increase in the number of waveform signals inevitably involves an increase in the number of bits included in a select data set that is to be used for selecting, for each nozzle, any one of a plurality of waveform signals. Thus, not only nozzles but also bits included in a select data set for each nozzle are increased in number. As a result, the select data transmitted from a main body to a head driver of a recording apparatus include a considerably increased number of bits in total. When, like this, the total number of bits included in the transmitted select data is increased, a longer transmission time is required. This causes difficulty in high-speed printing which should have been an original object. However, when the select data are transmitted at a higher rate (i.e., when a clock signal applied for every transmission has a higher frequency) for the purpose of high-speed printing, signal lines emit more noise during transmission, to adversely affect peripheral devices of the recording apparatus.

SUMMARY OF THE INVENTION

An object of the present invention is to provide a device for driving a recording head and a recording apparatus, which are capable of suppressing emitted noise and at the same time shortening a transmission time.

According to a first aspect of the present invention, there is provided a device for driving a recording head comprising: a plurality of select data input elements; a waveform signal selector; and a drive signal supplier. To the plurality of select data input elements, a plurality of select data sets corresponding to a plurality of recording elements included in the recording head are inputted in a serial manner. Each one of the select data sets indicates which one among a plurality of waveform signals is to be employed for a corresponding recording element in a single printing cycle. The waveform signal selector selects, for each of the recording elements, one among the plurality of waveform signals on the basis of a corresponding one among the plurality of select data sets inputted to the select data input elements. The drive signal supplier supplies, based on a waveform signal selected by the waveform signal selector, a drive signal to each of the plurality of recording elements. The number of the select data input elements is greater than the number of bits included in each of the select data sets. The number of signal lines through which the plurality of select data sets are inputted to the select data input elements in a serial manner is the same as the number of the select data input elements.

Like this, the number of signal lines through which the select data sets are transmitted is greater than the number of bits included in each of the select data sets. In such a case, as compared with a case where the number of signal lines is the same as the number of bits included in each of the select data sets, the select data can be transmitted at a less rate (which means that a clock signal applied to the device for every transmission has a lower frequency), to thereby suppress noise emitted from the respective signal lines. This can shorten a transmission time and therefore allows higher-speed printings.

According to a second aspect of the present invention, there is provided a recording apparatus comprising a recording head including a plurality of recording elements; a device for driving the recording head; and a main circuit. The main circuit comprises: a waveform signal generator; a distributor; a plurality of select data generators; and a transmitter. The waveform signal generator generates a plurality of waveform signals to be used for driving the plurality of recording elements in different modes from one another. The distributor distributes a plurality of pixel data sets corresponding to the plurality of recording elements into a plurality of groups on a pixel-data-set basis. Each one of the pixel data sets indicates which gradation value is to be employed for a corresponding recording element in a single printing cycle. The plurality of select data generators correspond to the plurality of groups respectively and generate, on the basis of the plurality of pixel data sets, a plurality of select data sets each including such a number of bits as adequate to indicate the plurality of waveform signals respectively. Each one of the select data sets indicates which one among the plurality of waveform signals is to be employed for a corresponding recording element in a single printing cycle. The transmitter includes a plurality of signal lines through which the plurality of select data sets are transmitted to the device. The number of the signal lines is the same as the number of the groups so that the plurality of signal lines connects the plurality of select data generators with the device for driving the recording head for each of the groups. The device for driving the recording head comprises; a plurality of select data input elements; a waveform signal selector; and a drive signal supplier. To the plurality of select data input elements, the plurality of select data sets are inputted in a serial manner through the plurality of signal lines. The waveform signal selector selects, for each of the recording elements, one among the plurality of waveform signals on the basis of a corresponding one among the plurality of select data sets inputted to the select data input elements. The drive signal supplier supplies, based on a waveform signal selected by the waveform signal selector, a drive signal to each of the plurality of recording elements. The number of the signal lines is greater than the number of bits included in each of the select data sets.

The aforementioned recording apparatus provides the same effects as those obtained by the device according to the aforesaid first aspect.

BRIEF DESCRIPTION OF THE DRAWINGS

Other and further objects, features and advantages of the invention will appear more fully from the following description taken in connection with the accompanying drawings in which:

FIG. 17 is an explanatory view concerning hysteresis calculations in the select data generator;

FIG. 20 shows relations between transfer clocks and select data sets that are transmitted in synchronization with these transfer clocks;

DESCRIPTION OF THE PREFERRED EMBODIMENTS

In the following, some preferred embodiment of the present invention will be described with reference to the accompanying drawings.

First, referring to FIGS. 1 to 7, a description will be given to a construction of an ink-jet printer according to a first embodiment of the present invention.

Figure 1:
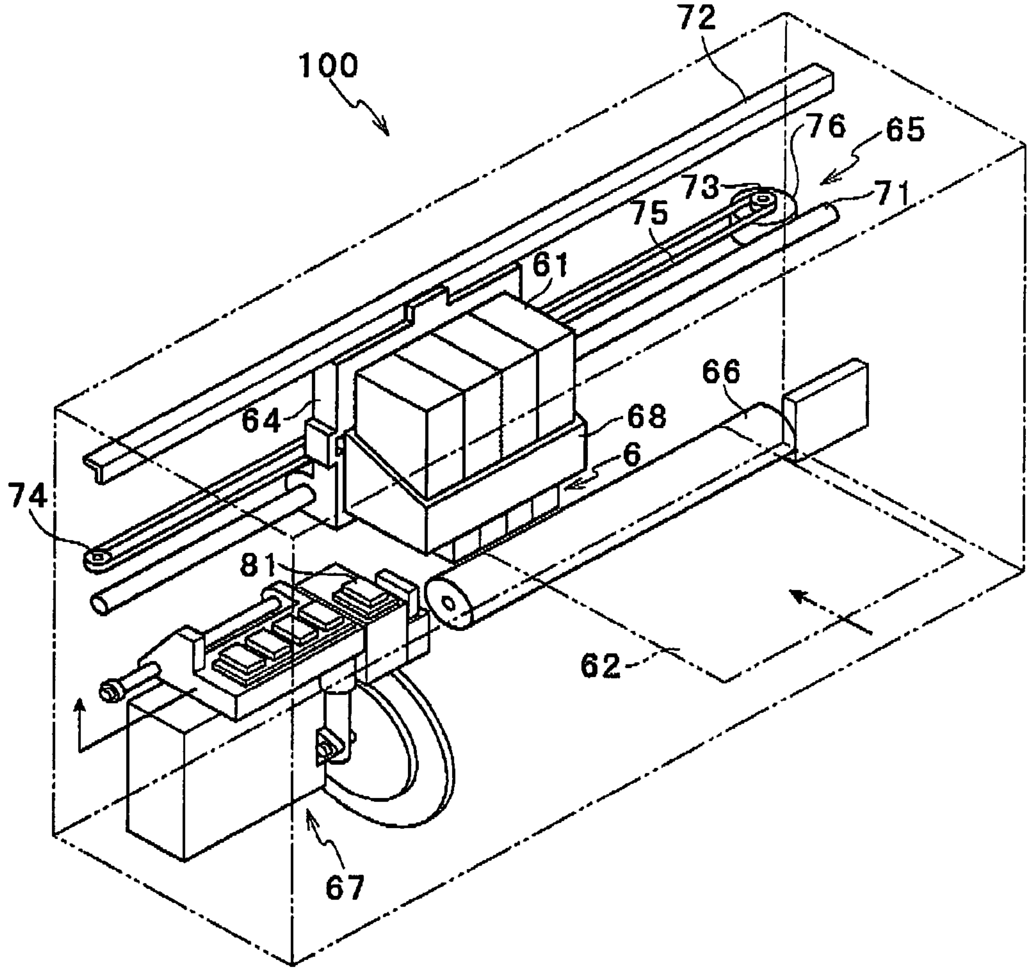
FIG. 1 is a perspective view of an ink-jet printer according to a first embodiment of the present invention.

As illustrated in FIG. 1, four piezoelectric ink-jet heads 6 are fixed to a main frame 68 of a color ink-jet printer 100. In addition, four ink cartridges 61 are removably mounted to the main frame 68. The four piezoelectric ink-jet heads 6 serve to eject ink of four colors (i.e., magenta, yellow, cyan, and black), respectively. The four ink cartridges 61 are filled with ink of the four colors, respectively. The main frame 68 is fixed to a carriage 64 that is driven in linear reciprocation by a drive mechanism 65. A platen roller 66 for forwarding a paper 62 is arranged with its axis laid in parallel with a reciprocation direction of the carriage 64. The platen roller 66 confronts the four ink-jet heads 6.

The carriage 64 is supported in a slidable manner by a guide shaft 71 and a guide plate 72 both disposed in parallel with the axis of the platen roller 66. Pulleys 73 and 74 are supported near both ends of the guide shaft 71, and are spanned with an endless belt 75. The carriage 64 is secured to the endless belt 75. In the drive mechanism 65 thus constructed, when one pulley 73 is driven in reversible rotation by a motor 76, the carriage 64 is accordingly reciprocated in linear direction along the guide shaft 71 and the guide plate 72, so that the ink-jet heads 6 are also reciprocated.

A paper 62 is fed from a paper feed cassette (not illustrated) provided at one side of the ink-jet printer 100, then guided into a space between the ink-jet heads 6 and the platen roller 66, then subjected to a predetermined printing with ink ejected through the ink-jet heads 6, and subsequently discharged from the ink-jet printer 100.

A purge system 67 is provided for forcibly sucking and removing defective ink which contains bubbles, dusts, or the like accumulated inside the ink-jet heads 6. The purge system 67 locates on one side of the platen roller 66. A position of the purge system 67 is determined such that, when the drive mechanism 65 brings the ink-jet heads 6 into a reset position, the purge system 67 may face the ink-jet heads 6. The purge system 67 includes a purge cap 81 that is to be attached to lower ends of the ink-jet heads 6 so as to cover many nozzles 35 (see FIGS. 2 to 6) formed on a lower face of the ink-jet heads 6.

Figure 2:
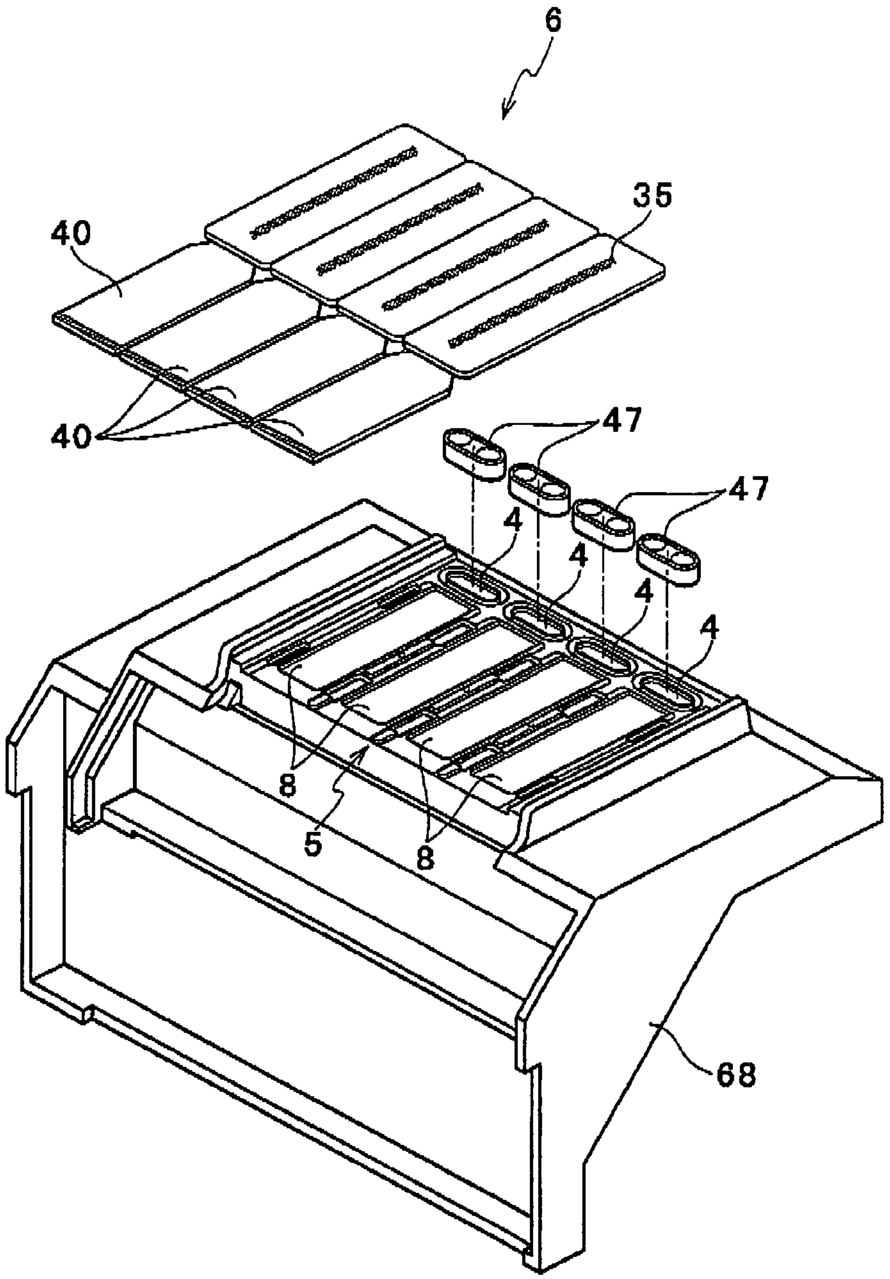
FIG. 2 is an exploded perspective view of ink-jet heads and a main frame.

FIG. 2 is an exploded perspective view of an inverted ink-jet heads 6. The main frame 68 of the ink-jet heads 6 has a nearly box-like shape with a top face thereof (which faces downward in FIG. 2) opened. As illustrated in FIG. 1, the four ink cartridges 61 can removably be mounted through the upper side of the main frame 68. As illustrated in FIG. 2, ink supply passages 4 are formed in the main frame 68. The ink supply passages 4 are connected to ink discharging portions provided at lower ends of the respective ink cartridges 61. The ink supply passages 4 extend to a lower face of a bottom plate 5 of the main frame 68 (i.e., extend to a face to which the ink-jet heads 6 are fixed). Joint members 47 made of rubber, etc., are attached to the lower face of the bottom plate 5 to correspond to the respective ink supply passage 4 such that each joint member 47 may be in close contact with an ink supply port (not illustrated) of each ink-jet head 6. The bottom plate 5 has, in its lower face, four support portions a each formed into a stepped shape for arranging the four ink-jet heads 6 in parallel with one another. In the support portions 8, the ink-jet heads 6 are secured using an ultraviolet-curing adhesive or the like.

Figure 3:
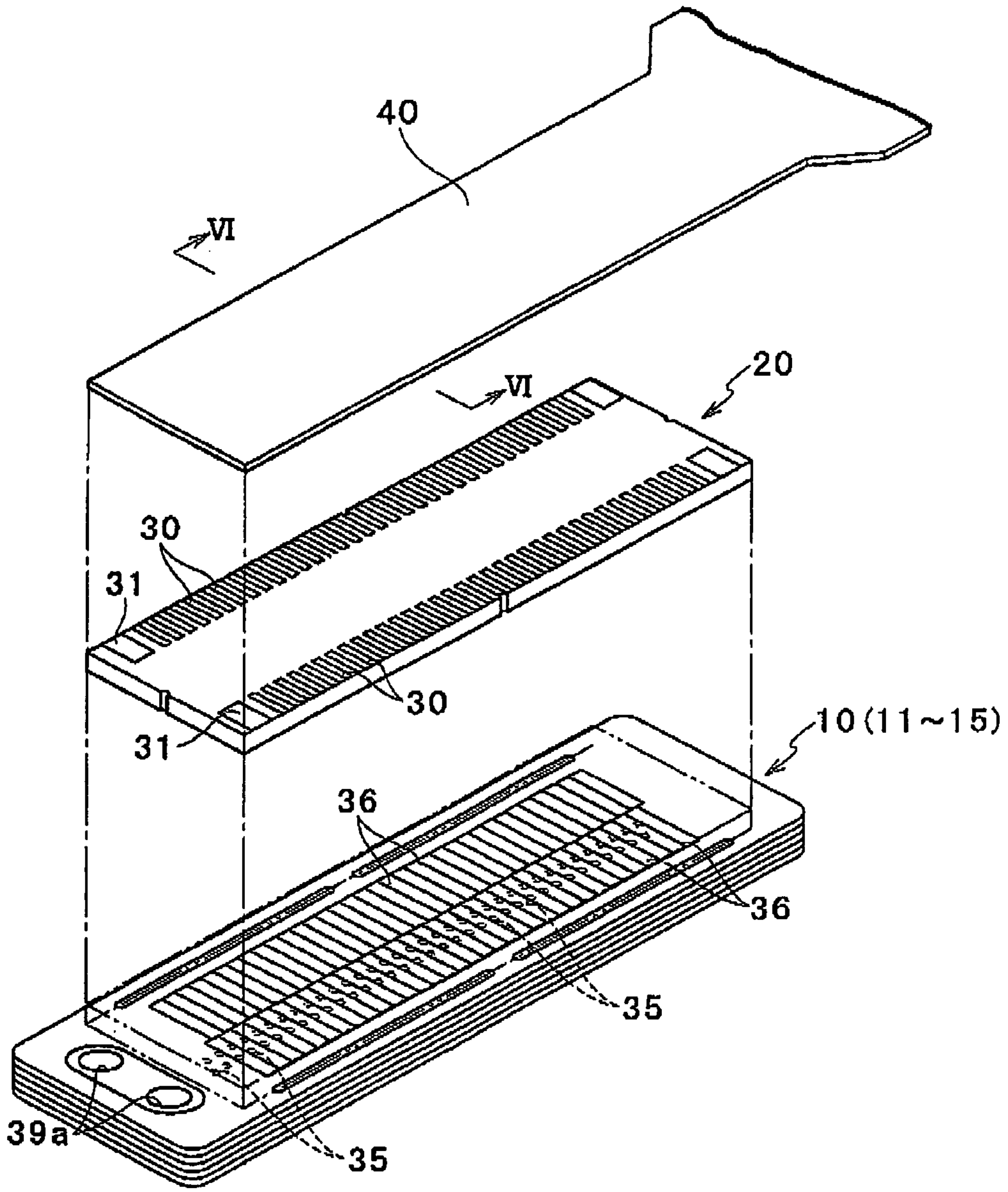
FIG. 3 is an exploded perspective view of the ink-jet head.

As illustrated in FIG. 3, the ink-jet head 6 includes a passage unit 10 having a layered structure. An actuator unit 20 having a flat plate shape is bonded onto an upper face of the passage unit 10. A flexible flat cable 40, which has electrical connection with a driver IC 103 (see FIGS. 9 and 18), is layered and bonded on an upper face of the actuator unit 20 using an adhesive. A large number of nozzles 35 each opening at its lower side are formed in a lower face of the passage unit 10. Each nozzle 35 ejects ink downward.

As illustrated in FIGS. 3 to 6, the passage unit 10 has a layered structure in which six thin plates made of metal are laminated and bonded to one another. The six thin plates are a nozzle plate 11, a damper plate 12, two manifold plates 13X and 13Y, a spacer plate 14, and a base plate 15.

Figure 4:
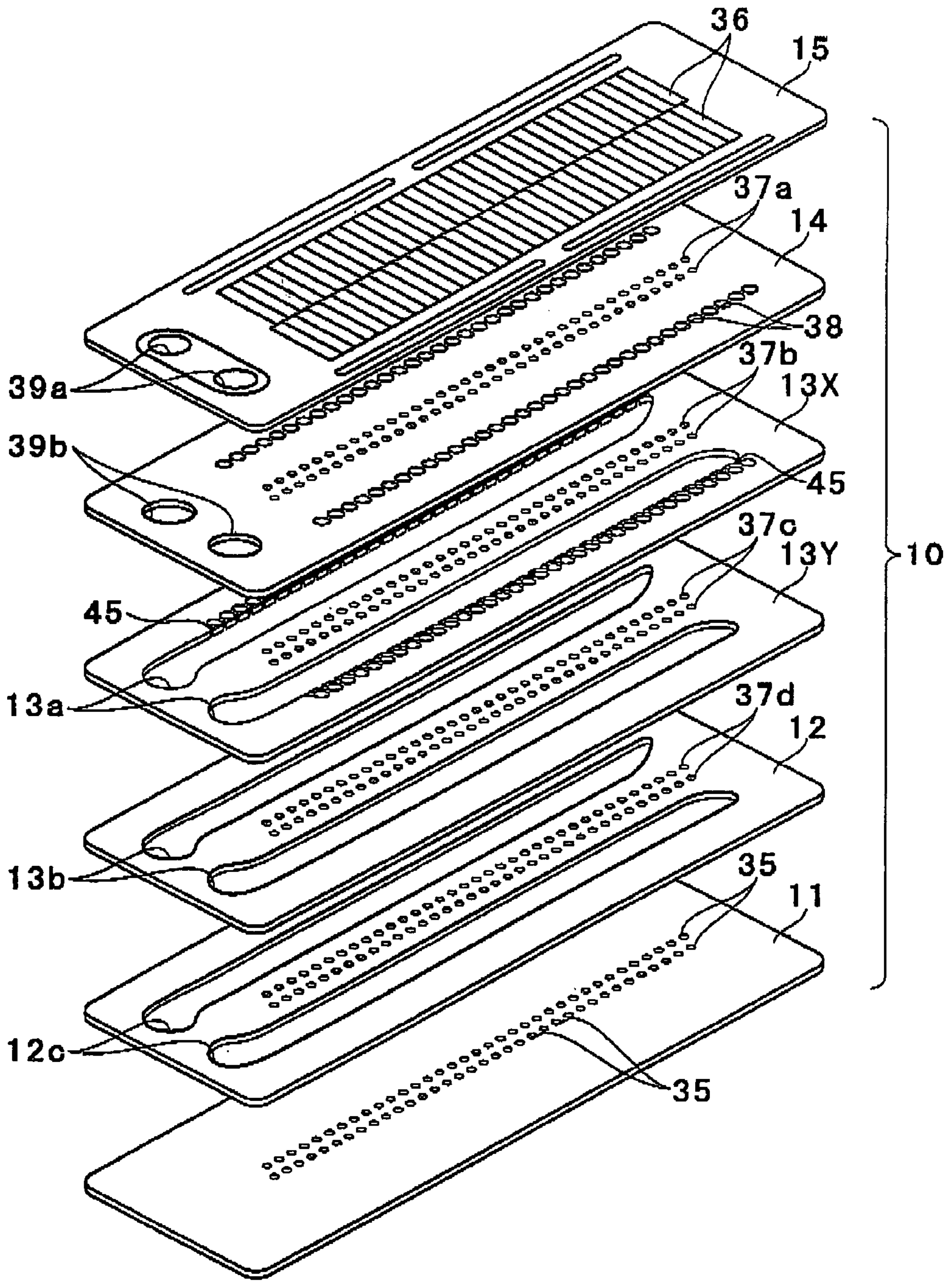
FIG. 4 is an exploded perspective view of a passage unit.
Figure 5:
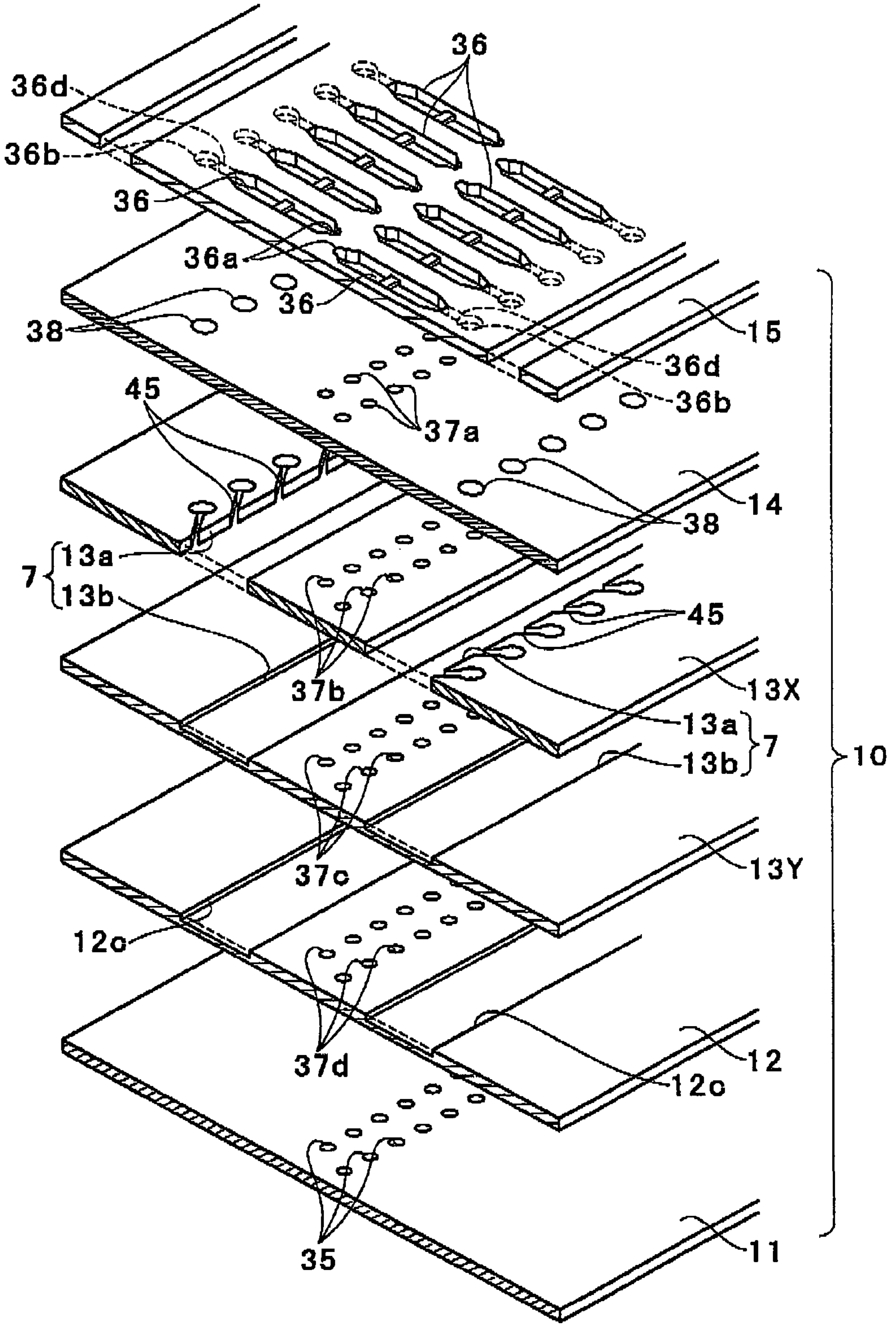
FIG. 5 is a local enlarged perspective view of FIG. 4.

Referring to FIGS. 4 and 5, in the nozzle plate 11, a large number of nozzles 35 for ejecting ink are formed at predetermined intervals. The nozzles 35 are arranged in a zigzag pattern to form two rows along a longitudinal direction of the nozzle plate 11. In the base plate 15, a plurality of pressure chambers 36 are arranged in a zigzag pattern to form two rows along a longitudinal direction of the base plate 15. Each of the pressure chambers 36 has a substantially rectangular shape in a plan view, and its longitudinal direction is perpendicular to the longitudinal direction of the base plate 15. Referring to FIG. 5, throttles 36*d* and ink supply ports 36*b* are formed at a side of the base plate 15 facing the spacer plate 14. The throttles 36*d* are connected to the respective pressure chambers 36. The ink supply ports 36*b* are connected to the respective throttles 36*d*. An end 36*a* of each pressure chamber 36 near a widthwise center of the base plate 15 communicates with a corresponding nozzle 35 via through holes 37*a*, 37*b*, 37*c*, and 37*d* that are formed in the zigzag pattern in the spacer plate 14, the two manifold plates 13X and 13Y, and the damper plate 12, respectively.

Figure 6:
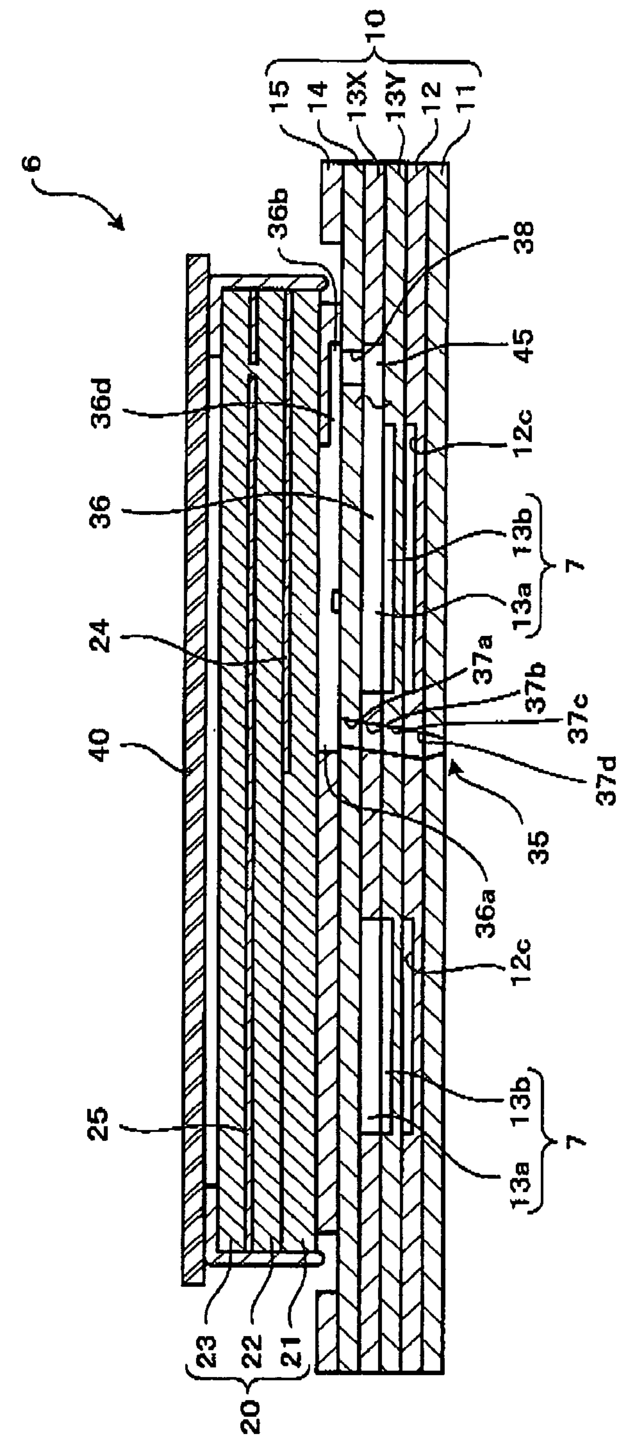
FIG. 6 is a sectional view as taken along a line VI-VI of FIG. 3.

As illustrated in FIG. 4, two half ink chambers 13*a* are formed in the manifold plate 13*x* which is nearer to the spacer plate 14 than the other manifold plate 13Y is. The half ink chamber 13*a* is, in a plan view, elongated along the longitudinal direction of the plate 13*x*. The two half ink chambers 13*a* are so formed as to sandwich therebetween rows of the through holes 37*b*. On the other hand, two half ink chambers 13*b* are formed in the manifold plate 13Y which is nearer to the nozzle plate 11. The half ink chambers 13*b* and the half ink chambers 13*a* are substantially identical for their position, shape, and size in a plan view. Formed in a sidewall of each half ink chamber 13*a* are a large number of connecting portions 45 formed along the longitudinal direction of the half ink chamber 13*a*. Each connecting portion 45 corresponds to each of the ink supply ports 36*b*, as shown in FIGS. 5 and 6. Referring to FIG. 5, the half ink chambers 13*a* of the manifold plate 13*x* penetrate the plate 13*x*, whereas the half ink chambers 13*b* of the manifold plate 13Y are merely recesses that open toward the manifold plate 13*x* only. Referring to FIG. 6, a common ink chambers 7 appear when the two manifold plates 13X and 13Y are put in layers so that the half ink chambers 13*a* and 13*b* overlap in a plan view. In the passage unit 10 in which the six plates 11 to 15 are put in layers, the common ink chambers 7 locate opposite sides of the through holes 37*a* to 37*d* that are arranged in rows.

Referring to FIG. 5, the damper plate 12 is recessed to have damper grooves 12*c* formed therein. The damper grooves 12*c*, which open toward the manifold plate 13Y only, are substantially identical to the common ink chambers 7 for their position, shape, and size in a plan view. Referring to FIG. 4, two ink supply holes 39*a* are provided in the base plate 15, and ink supply holes 39*b* are provided in the spacer plate 14. These ink supply holes 39*a* and 39*b* locate to correspond to one ends of the two common ink chambers 7. Further, a large number of ink supply ports 38 are formed in the spacer plate 14. The ink supply ports 38 are arranged along the longitudinal direction of the plate 14 such that they sandwich therebetween rows of through holes 37*a*.

Referring to FIG. 6, formed in the passage unit 10 are individual ink passages (hereinafter referred to as "channel (Ch)") each extending from a common ink chamber 7 to a corresponding nozzle 35 via a connecting portion 45, an ink supply port 38, a throttle 36*d*, and a pressure chamber 36. In the ink-jet head of this embodiment, the number of individual ink passages (i.e., channels) is 304 in total including Ch0 through Ch303. In each individual ink passage, ink reserved in the pressure chamber 36 is given ejection energy by the actuator unit 20, so that the nozzle 35 ejects the ink through the through holes 37*a* to 37*d*.

The actuator unit 20 will next be described.

Figure 7:
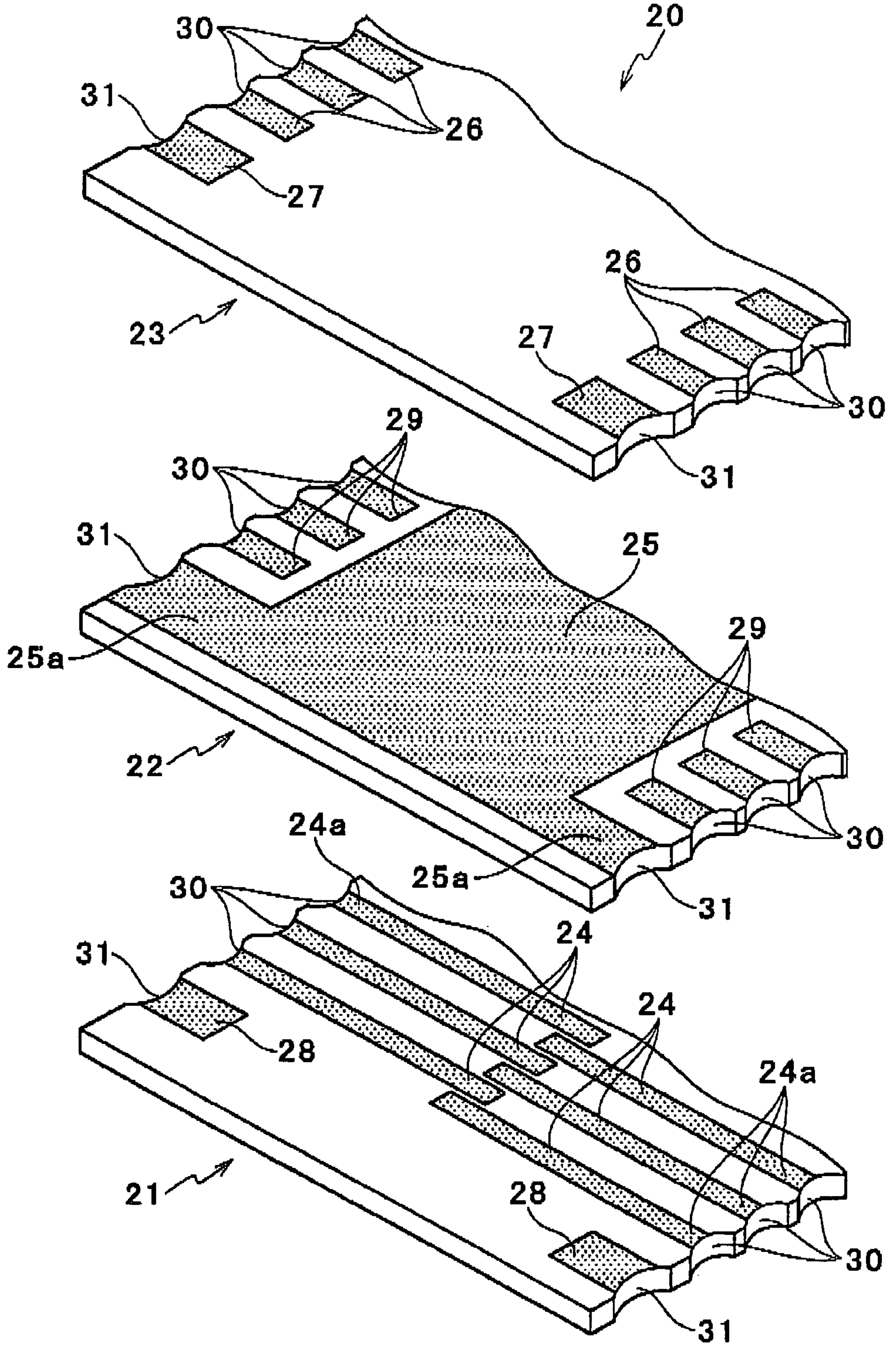
FIG. 7 is a local enlarged perspective view of an actuator unit.

As illustrated in FIGS. 6 and 7, the actuator unit 20 has a layered structure of one insulating sheet 23 and two kinds of piezoelectric sheets 21 and 22. A plurality of driving electrodes 24 are formed on an upper face of one piezoelectric sheet 21. The plurality of driving electrodes 24 correspond to the respective pressure chambers 36 formed in the passage unit 10. Referring to FIG. 7, each driving electrode 24 has its one end 24*a* exposed on a side face of the actuator unit 20.

A common electrode 25 common to a plurality of pressure chambers 36 is formed on an upper face of the other piezoelectric sheet 22. The common electrode 25 also has its one end 25*a* exposed on a side face of the actuator unit 20, which is similar to the one end 24*a* of the driving electrode 24. A portion of the piezoelectric sheet 22 sandwiched between each driving electrode 24 and the common electrode 25 acts as a pressure generation portion that corresponds to each pressure chamber. Surface electrodes 27 corresponding to the common electrode 25 and many surface electrodes 26 corresponding to the respective driving electrodes 24 are formed on an upper face of the insulating sheet 23 of the top layer. The surface electrodes 27 and 26 are arranged along both edges of the insulating sheet 23.

First recesses 30 and second recesses 31 are formed in side faces of the insulating sheet 23 and the piezoelectric sheets 21 and 22. A position of the first recess 30 corresponds to the one end 24*a* of the driving electrode 24. A position of the second recess 31 corresponds to the one end 25*a* of the common electrode 25. The first recesses 30 and the second recesses 31 extend in a lamination direction of the sheets. Formed in each first recess 30 is a side-face electrode that connects each driving electrode 24 with each surface electrode 26. Formed in each second recess 31 is a side-face electrode that connects each common electrode 25 with each surface electrode 27. Reference numbers 28 and 29 denote electrodes of dummy patterns.

The passage unit 10 and the actuator unit 20 are put in layers such that the pressure chambers 36 of the passage unit 10 may correspond to the respective driving electrodes 24 of the actuator unit 20. On the upper face of the actuator unit 20, the flexible flat cable 40 and the surface electrodes 26 and 27 are electrically bonded to each other. One actuator that ejects ink droplets from corresponding nozzles 35 is constituted by: the surface electrodes 26 and the individual electrodes 24 corresponding to the respective pressure chambers 36; the surface electrodes 27 and the common electrode 25; and the piezoelectric sheets 21, 22, and 23.

In the ink-jet printer 100 of this embodiment, the individual ink passage (Ch) including the nozzle 35 and the aforementioned actuator are equivalent to a recording element according to the present invention.

When pressure is selectively applied to between the common electrode 25 and the driving electrode 24 that is electrically connected to the surface electrode 26, a portion of the piezoelectric sheet 22 corresponding to the pressurized driving electrode 24 is distorted in the lamination direction due to piezoelectric. Thereby, the volume of the corresponding pressure chamber 36 is reduced. This raises pressure of ink contained in the pressure chamber 36, so that the ink is ejected through the nozzle 35.

Next, with reference to FIGS. 8 to 20, a detailed description will be given to an electrical construction for ink ejection of the ink-jet printer 100.

Figure 8:
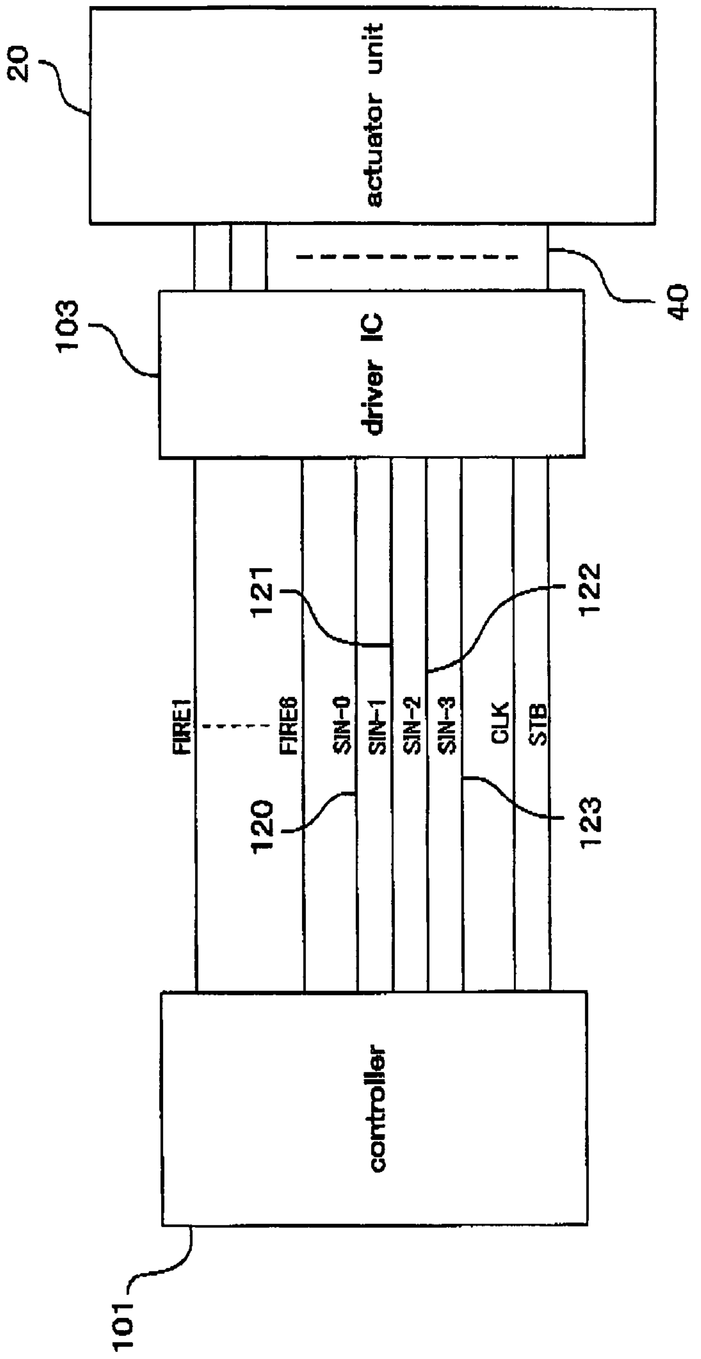
FIG. 8 is a schematic block diagram showing an electrical connection between a controller and an ink-jet head.
Figure 9:
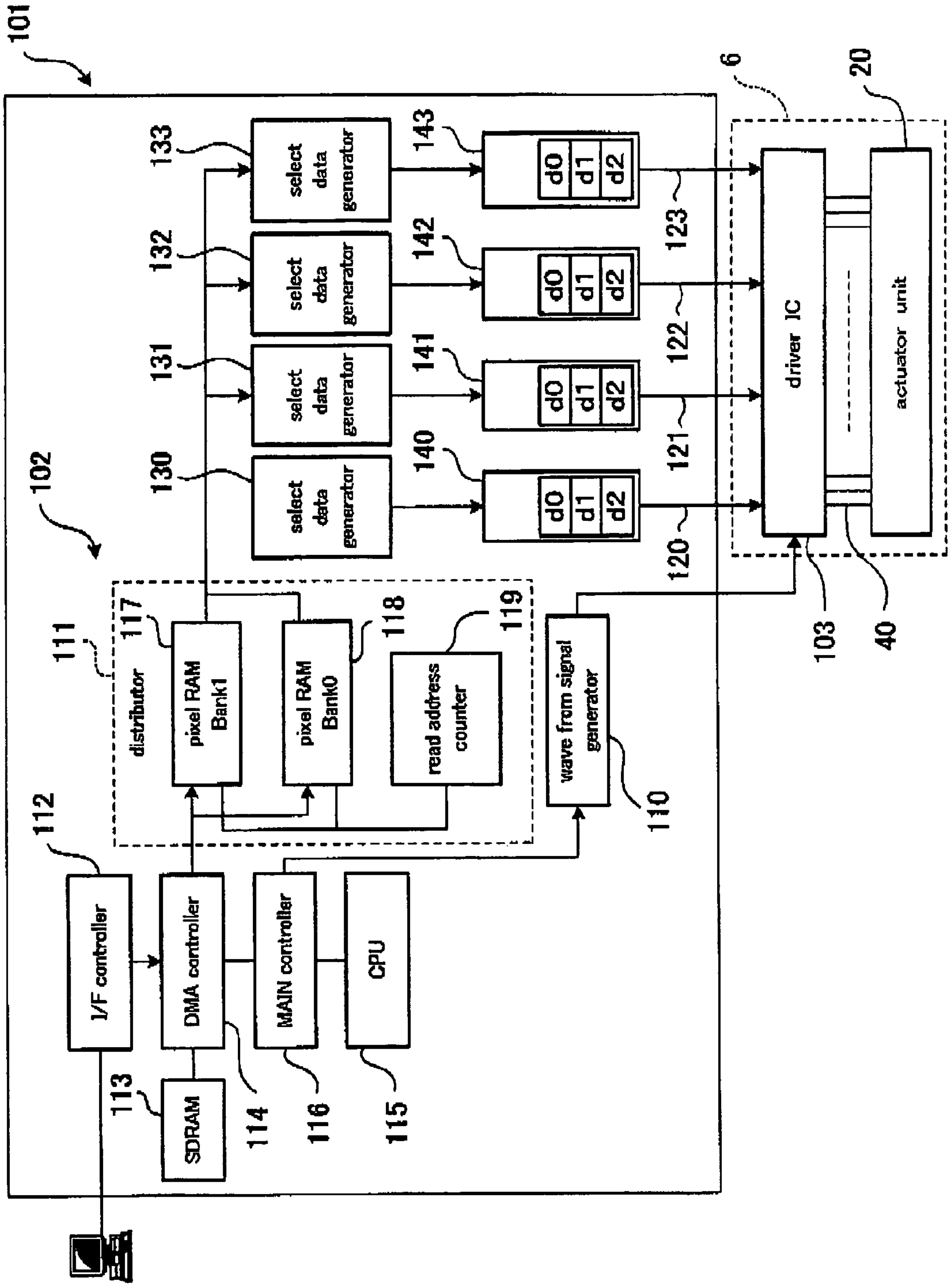
FIG. 9 is a block diagram of the controller.

As shown in FIGS. 8 and 9, a controller 101 of the ink-jet printer 100 is electrically connected to the driver IC 103 via signal lines 120 to 123, etc. The driver IC drives the ink-jet heads 6. In addition, as described above, the driver IC 103 and the actuator unit 20 are electrically connected to each other via the flexible flat cable 40.

Referring to FIG. 9, a main circuit 102 of the controller 101 includes a waveform signal generator 110, a distributor 111, four select data generators 130 to 133, and four transfer buffers 140 to 143. In order to perform gradation printing, the waveform signal generator 110 generates six waveform signals (FIRE1-FIRE6) shown in FIG. 8. The six waveform signals are used to drive a plurality of actuator units in different modes from one another. The distributor 111 distributes, into four groups, a plurality of pixel data sets that have been transmitted from an external device such as a personal computer to the main circuit 102. A single pixel data set indicates which gradation value is to be employed for a single channel in a single printing cycle. Here, the “single printing cycle” means a time required for the paper 62 to move relative to the ink-jet heads 6 by a distance corresponding to a printing resolution. Based on the pixel data sets distributed into four groups, each of the select data generators 130 to 133 generates a three-bit select data set that corresponds to any one of seven signals, i.e., the six waveform signals plus a signal VDD1 (see FIG. 18) that indicates no ejection. Hereinafter, these seven signals are all referred to as “waveform signals”. Here, the “select data set” indicates which one of the seven waveform signals is to be employed for a single channel in a single printing cycle. The transfer buffers 140 to 143 are connected to four signal lines 120 to 123 that correspond to the respective four groups into which the pixel data sets have been distributed. The transfer buffers 140 to 143 transmit the select data sets to the driver IC 103 through the signal lines 120 to 123.

An external device such as a personal computer inputs the pixel data sets concerning a to-be-printed image to the controller 101 via an I/F (interface) controller 112. These pixel data sets are, via a DMA (Direct Memory Access) controller 114, stored in an SDRAM (Synchronous Direct Random Access Memory) 113. The DMA controller 114 is under control of a MAIN controller 116 that is connected to a CPU 115.

Figure 10:
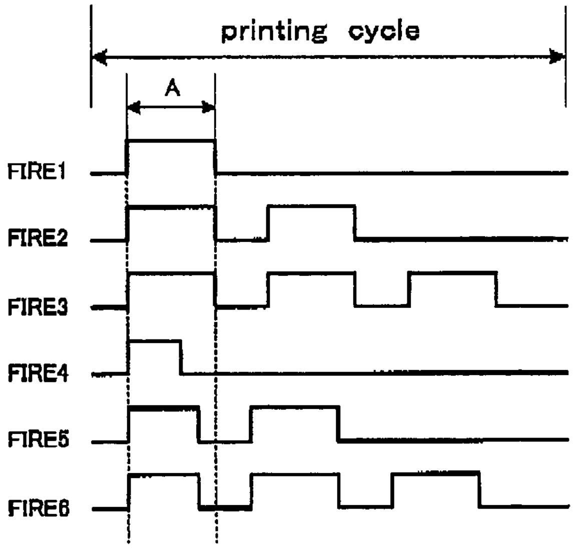
FIG. 10 illustrates forms of waveform signals.

In the ink-jet printer 100, the waveform signal generator 110 generates the six waveform signals (FIRE1-FIRE6), based on which gradation printing can be performed. FIG. 10 illustrates forms of the six waveform signals FIRE1-FIRE6. Among the six waveform signals FIRE1 to FIRE6, three waveform signals FIRE1 to FIRE3 are pulse train signals which reach high level at different frequencies from one another. These waveform signals FIRE1 to FIRE3 serve for a gradation control by changing the number of ink ejections from the nozzle 35 in accordance with the frequency of the high-level state. To be more specific, during a single printing cycle, the FIRE1 ejects an ink droplet once, the FIRE ejects an ink droplet twice, and the FIRE3 ejects an ink droplet three times, so that the amount of ink ejected in a single printing cycle is changed accordingly. On the other hand, FIRE4 to FIRE6 serve for a so-called hysteresis control by, in accordance with the immediately preceding ink ejection amount, shortening the pulse width as compared with FIRE1 to FIRE3 to thereby improve print quality.

Figures 11, 12:
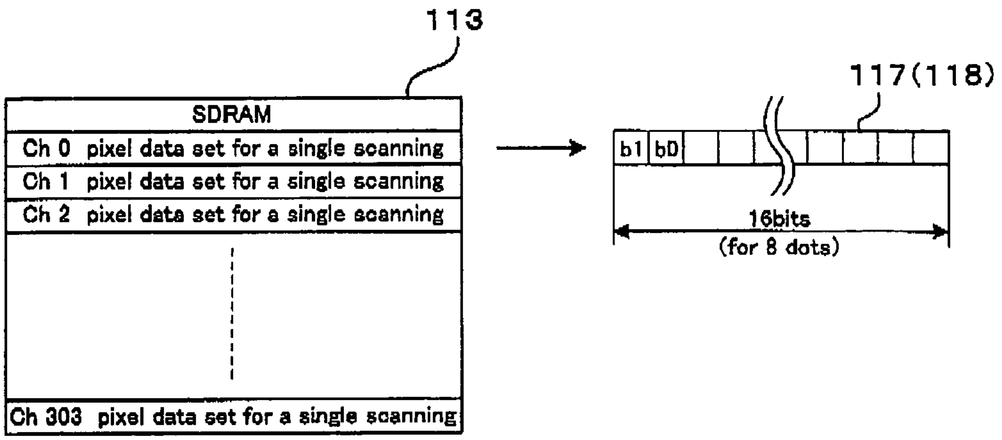
FIG. 11 illustrates a data structure of an SDRAM.
FIG. 12 illustrates correspondences between pixel data sets and ink ejection amounts.

As shown in FIG. 11, pixel data sets that correspond to the respective channels for a single scanning are sequentially stored in the SDRAM 113. As shown in FIG. 12, each pixel data set stored in the SDRAM 113 is constituted of two bits (b1, b0). Combinations of bit values of these two bits (b1, b0) represent four versions of ink ejection amount (i.e., zero, small, middle, and large) during a single printing cycle. Here, the ink ejection amount being zero means no ink ejection performed.

Figure 13:
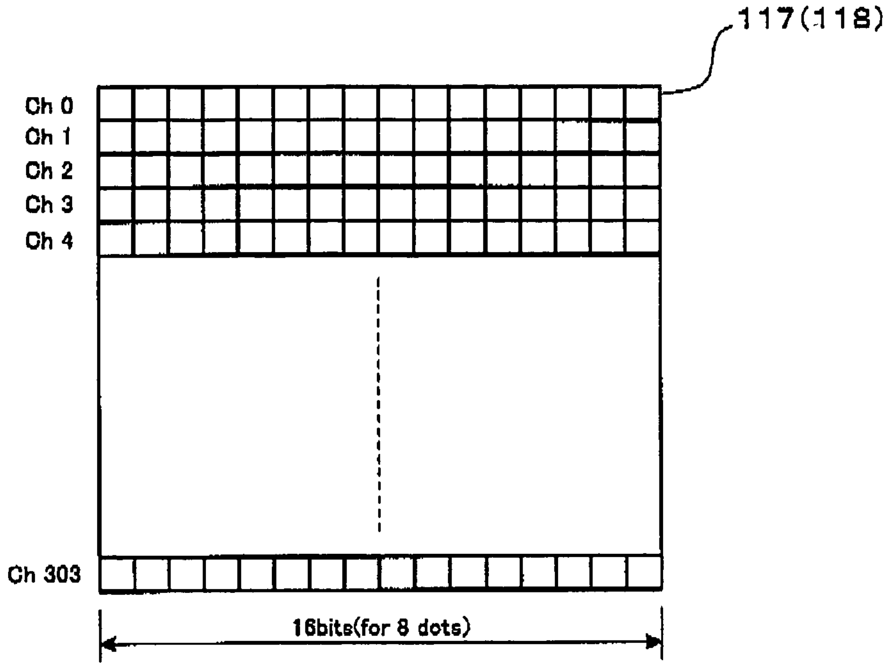
FIG. 13 illustrates a data structure of a pixel RAM.

Then, the many pixel data sets stored in the SDRAM 113 are, on a set basis, distributed into four groups by the distributor 111. The distributor 111 includes two pixel RAMs 117, 118 (Bank1, Bank0) which are SRAMs (Static Random Access Memories), and a read address counter 119. As shown in FIGS. 11 and 13, a 16-bit pixel data set (for 8 dots) corresponding to each of Ch0 to Ch303 is forwarded from the SDRAM 113 to either one of the two pixel RAMs 117 and 116 in which they are stored. At the same time, in the other one of the pixel RAMs 117 and 118, the pixel data sets are, in an order indicated by arrows of FIG. 14, read out of an address designated by the read address counter 19. Then, the many pixel data sets are distributed into four groups, and the four groups of pixel data sets thus distributed are forwarded to the four select data generators 130 to 133, respectively.

Figure 14:
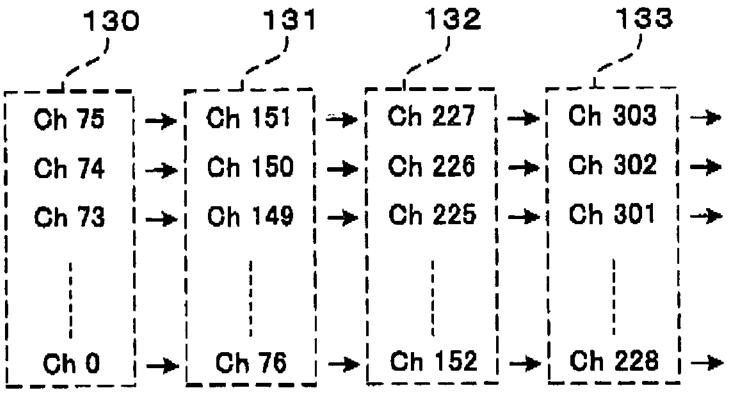
FIG. 14 illustrates in what order select data are transferred to four select data generators.

The pixel data sets are forwarded from the pixel RAM 117 (or 118) to the four select data generators 130 to 133 in the order indicated by the arrows of FIG. 14, for the following reason. A description will be given to, as an example, Ch75, Ch151, Ch227, and Ch303 for which the pixel data sets are firstly forwarded from the pixel RAM 117 (or 118) to the four select data generators 130 to 133, respectively. Ink of the same color flows through these channels Ch75, Ch151, Ch227, and Ch303. That is, Ch75, Ch151, Ch227, and Ch303 belong to one of color-based recording element groups which are distinguished from one another depending on colors. The four select data generators 130 to 133 generate later-described select data sets each constituted of three bits (d0 to d2). Subsequently, the select data sets d0 to d2 are transmitted to the driver IC 103 through the four signal lines 120 to 123, respectively. At this time, the select data sets d0 to d2 corresponding to Ch75, Ch151, Ch227, and Ch303 need be transmitted at the same timing. For this purpose, the pixel data sets are forwarded in the aforementioned order. This will be detailed later in conjunction with a description of the driver IC 103.

Figures 15, 16:
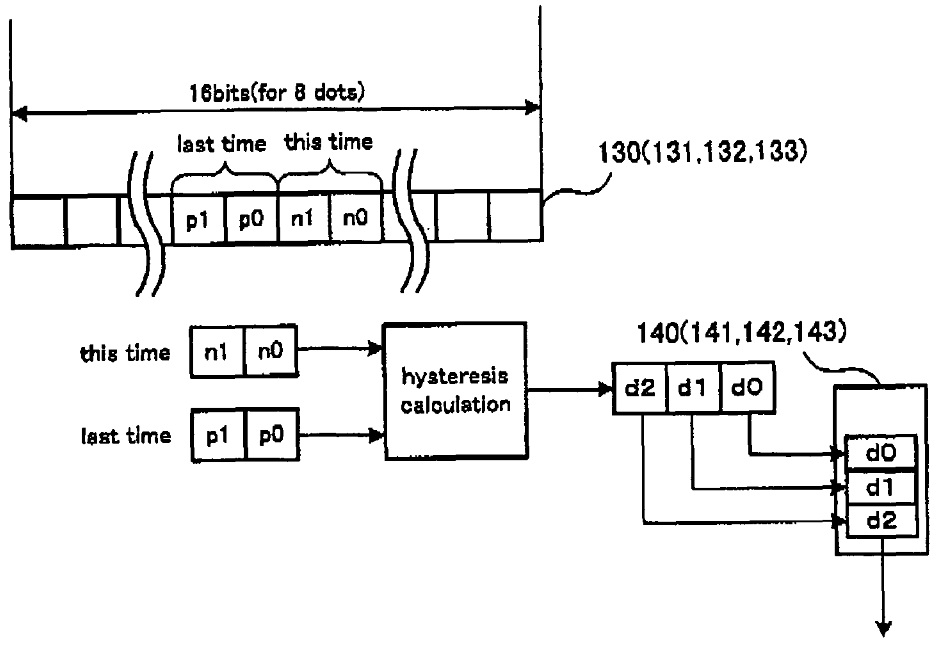
FIG. 15 illustrates correspondences between select data sets and waveform signals.
FIG. 16 is an explanatory view concerning a generation of the select data set in the select data generator.

The select data generators 130 to 133 comprise memories for storing eight-dot pixel data sets (each having 16 bits) that have been distributed into four groups by the distributor 111. Based on the pixel data sets, the select data generators 130 to 133 generate select data sets, each of which is used for selecting, in the later-described driver IC 103, any one of seven waveform signals FIRE1 to FIRE6 and VDD1 in correspondence with each nozzle 35 (i.e., each channel). Here, the signal VDD1 is always kept at the same potential as the high level of the remaining six waveform signals FIRE1 to FIRE6. As shown in FIG. 15, the select data set is constituted of three bits (d0, d1, and d2) in order to have one-to-one correspondence with seven signals in total, i.e., six waveform signals FIRE1-FIRE6 plus a signal VDD1.

Each of the select data generators 130 to 133 calculates a hysteresis in consideration of the last (immediately preceding) ink ejection amount, and thereby determines which waveform signal is suitable for the current ink ejection amount, and then generates a select data set that corresponds to the suitable waveform signal. To be more specific, as shown in FIG. 16, each of the select data generators 130 to 133 determines a waveform signal by, as shown in FIG. 17, calculating a hysteresis based on the current two-bit pixel data set (n1, n0) and the last two-bit pixel data set (p1, p0). Then, the select data generator generates such a select data set d0 to d2 as to correspond to the waveform signal thus determined.

Referring to a table of FIG. 17, when the current ink ejection amount is zero (that means no ink is ejected) as shown in the first row of the table, there is generated a select data set that corresponds to the waveform signal VDD1 (in which d2=0, d1=0, and d0=0) irrespective of the last ink ejection amount.

Referring to, in the table of FIG. 17, the column labeled as "ink ejection amount determined by hysteresis calculation", when the last ink ejection amount was zero (p1=0 and p2=0), currently generated is a select data set d0 to d2 that corresponds to the waveform signals FIRE1, FIRE2, or FIRE3 for normal ink ejection amount of small, middle, or large. In correspondence with, e.g., the waveform signal FIRE1 (ink ejection amount: small), a select data set in which d2=0, d1=0, and d0=1 is generated.

When ink was ejected last time with smaller ejection amount than that of this time, the last ink ejection is considered to give little influence on the current ink ejection characteristics. Therefore, generated is a select data set d0 to d2 that corresponds to the waveform signal (FIRE1, FIRE2, or FIRE3) for normal ink ejection amount of small, middle, or large, which is the same as in the aforementioned case where the last ink amount was zero.

When the last ink ejection amount is larger than the current ink ejection amount or when the last ink ejection amount is large and current ink ejection amount is also large, the last ink ejection is considered to give much influence on the current ink ejection characteristics. Therefore, generated is a select data set d0 to d2 that corresponds to the waveform signal (FIRE4, FIRE5, or FIRE6) for hysteresis control, whose first pulse width is shorter than a pulse width A of FIRE1 to FIRE3 (see FIG. 10). In FIG. 17, the column labeled as "ink ejection amount determined by hysteresis calculation" includes entries of "hysteresis small", "hysteresis middle", and "hysteresis large". In correspondence with, e.g., the waveform signal FIRE4 (ink ejection amount: hysteresis small), a select data set in which d2=1, d1=0, and d0=1 is generated.

The three-bit select data sets d0 to d2 thus generated in the four select data generators 130 to 133 are transmitted to the transfer buffers 140 to 143 corresponding to the select data generators 130 to 133. The three-bit select data sets d0 to d2 are, as shown in FIG. 9, serially outputted from the four transfer buffers 140-143 to the driver IC 103 through the four signal lines 120-123 respectively corresponding thereto.

Next will be described a construction of the driver IC 103 of the ink-jet heads 6.

Figure 18:
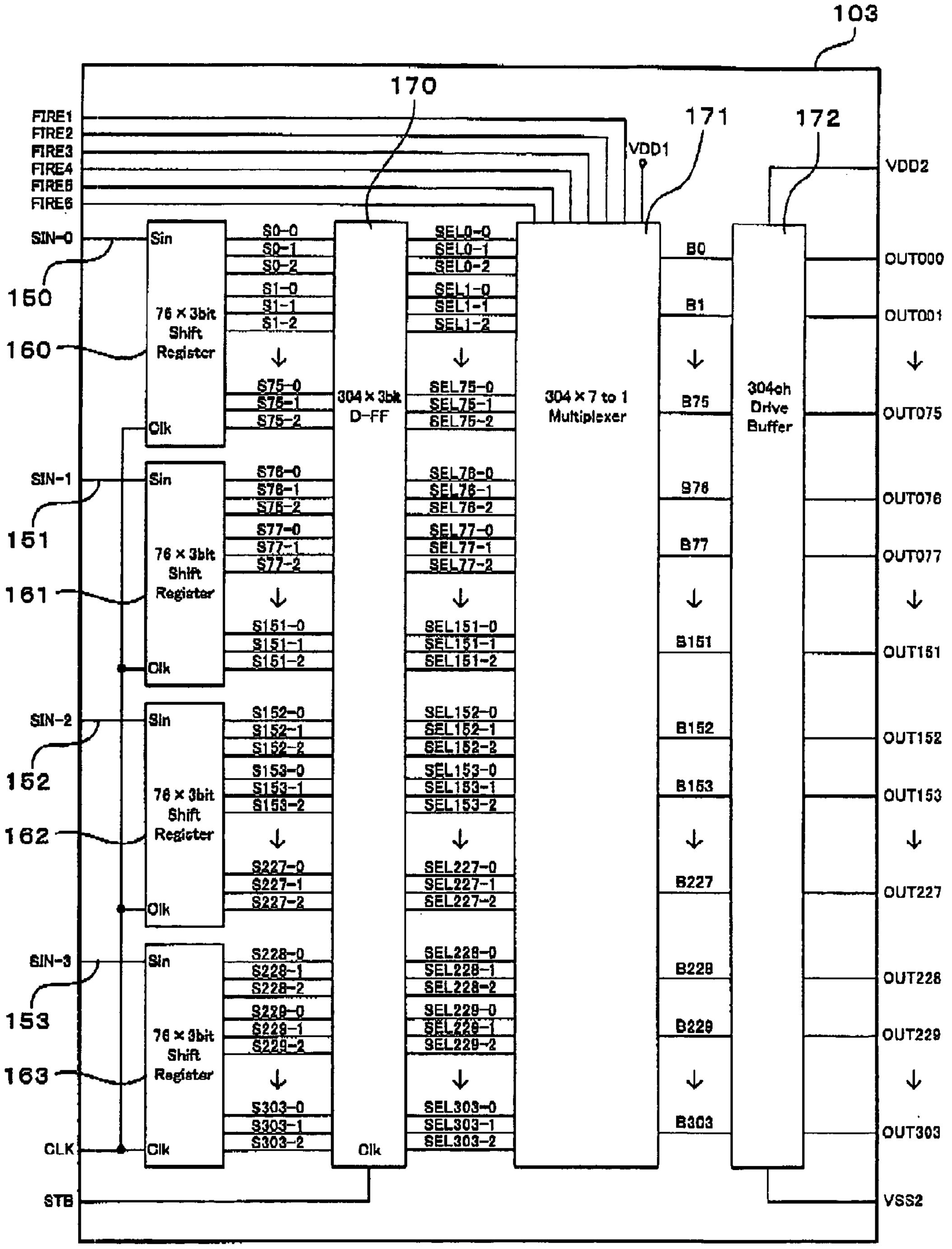
FIG. 18 is a block diagram of a driver IC.

As shown in FIG. 18, the driver IC 103 includes: four select data input elements 150 to 153; four shift registers 160 to 163 serving as serial-parallel converters; D-flip-flop 170 serving as a latch circuit; a waveform signal selector 171; and a drive buffer 172. A three-bit select data set is serially input from the main circuit 102 to each of the select data input elements 150 to 153. The shift registers 160 to 163 convert the select data sets, which have been input to the select data input elements 150 to 153, from serial ones to parallel ones. The waveform signal selector 171 selects, for each channel, one waveform signal among the seven waveform signals FIRE1 to FIRE6 plus VDD1 in accordance with the corresponding select data set. A waveform signal selected by the waveform signal selector 171 is output to the drive buffer 172 and then supplied to the actuator.

The three-bit select data sets are, through the four signal lines 120 to 123 (see FIG. 9), serially inputted to the four select data input elements 150 to 153 (see FIG. 18) respectively. Then, these three-bit select data sets are serially inputted to the four shift registers 160 to 163 in synchronization with a transfer clock CLK. Select data sets for 76 channels are inputted to each of the shift registers 160 to 163. Thus, each shift register 160 to 163 has a bit length of 228 bits (the number of channels (76 channels)×the number of bits included in each select data set (3 bits)). Serial select data sets are inputted to the shift registers 160 to 163 at a rise timing of the transfer clock CLK.

Figure 19:
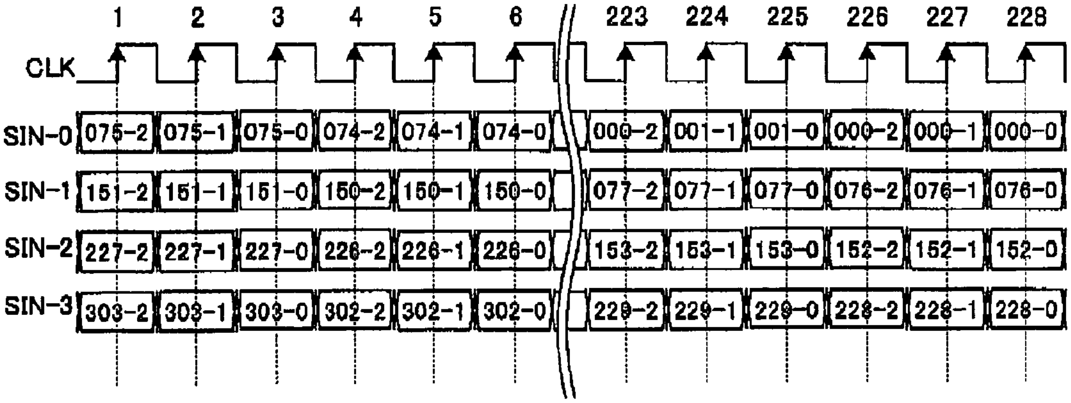
FIG. 19 is a time chart of transmission of the select data from a main circuit to the driver IC; is

As shown in FIGS. 18 to 20, the three-bit select data sets are, sequentially for every channel, inputted serially to the shift registers 160 to 163. Referring to FIG. 19, for example, 075-2(d2), 075-1(d1), and 075-0(d0), which form a three-bit select data set corresponding to Ch75, are inputted to the shift register 160 at timings of applications of first to third transfer clocks CLK in synchronization with the transfer clock CLK. Referring to FIG. 20, further, each channel corresponds to ink of any one of four colors (i.e., magenta, yellow, cyan, and black) employed in recordings by the ink-jet printer 100. The same color is assigned to channels corresponding to select data sets which are inputted to the four shift registers 160 to 163 upon the same transfer clock CLK. That is, recording elements including these respective channels belong to one of color-based recording element groups which are distinguished from one another depending on colors. For example, magenta ink flows through Ch75, Ch151, Ch227, and Ch303 corresponding to select data sets which are all transferred upon a first transfer clock CLK. Black ink flows through Ch74, Ch150, Ch226, and Ch302 corresponding to select data sets which are all transferred upon a second transfer clock CLK. The select data sets d0 to d2 each belonging to any one of the four color-based recording element groups are serially inputted to the shift registers 160 to 163 in a predetermined order of colors. In a serial input SIN-0 to the shift register 160, for example, channels Ch75, Ch74, Ch73, and Ch72 are for magenta ink, black ink, cyan ink, and yellow ink, respectively. Thereafter, subsequent select data sets are inputted to the shift register 160 in this order of colors (i.e., in an order of magenta, black, cyan, and yellow). The same occurs in inputs to the other shift registers 161 to 163. Since select data sets corresponding to a plurality of channels, respectively, are transferred to the shift registers 160 to 163 in this order, circuitries of the driver IC 103 and the main circuit 102 of the controller 101 can be simplified very much.

The shift registers 160 to 163 convert three-bit select data sets inputted thereto from serial data to parallel data, and then output, into the D-flip-flop 170, parallel signals Sx-0, Sx-1, and Sx-2 corresponding to every channel. Here, "x" represents a channel number, that is, represents any integer between 0 to 303. More specifically, in the shift register 160 x represents any integer between 0 to 75, in the shift register 161 x represents any integer between 76 to 151, in the shift register 162 x represents any integer between 152 to 227, and in the shift register 163 x represents any integer between 228 to 303.

At a rise timing of a strobe control signal STB which is forwarded from the main circuit 102, the D-flip-flop 170 turns the parallel signals Sx-0, Sx-1, and Sx-2 into select signals SELx-0, SELx-1, and SELx-2, and outputs the select signals SELx-0, SELx-1, and SELx-2 into the waveform signal selector 171 that is formed of a multiplexer.

Inputted to the waveform signal selector 171 are select signals SELx-0, SELx-1, and SELx-2 and seven waveform signals FIRE1 to FIRE6 plus VDD1. Based on the select signals SELx-0, SELx-1, and SELx-2, the waveform signal selector 171 selects corresponding one of the seven waveform signals FIRE1 to FIRE6 plus VDD1. Then, a selected waveform signal Bx is outputted into the driver buffer 172. The driver buffer 172 turns the waveform signal Bx which has been output from the waveform signal selector 171 into an ejection pulse signal OUTx having a predetermined voltage, and supplies the ejection pulse signal OUTx to an actuator corresponding to the channel.

In the above-described ink-jet printer 100, the three-bit select data set is, through the four signal lines 120 to 123, serially inputted from the main circuit 102 to the four select data input elements 150 to 153 of the driver IC 103. In this case, since the select data set is serially input through the signal lines, the number of signal lines can be easily increased no matter how many bits are included in the select data set. In this embodiment, the number of signal lines 120 to 123 (four signal lines) is greater than the number of bits included in the select data set (three bits). Accordingly, as compared with a case where the number of bits included in the select data set is the same as the number of signal lines, the select data can be transmitted from the main circuit 102 to the driver IC 103 at a less rate, to thereby suppress noise emitted from the respective signal lines 120 to 123. This can shorten a transmission time and therefore allows higher-speed printings.

In addition, the number of select data input elements 150 to 153 is one greater than the number of bits included in the select data set (three bits). Thus, the number of signal lines is increased just by one as compared with a case where the number of bit included in the select data set is the same as the number of signal lines. This enables a transmission rate to be reduced with utmost suppression of increase in cost which may otherwise be caused by an increased number of signal lines.

Next, a second embodiment of the present invention will be described with reference to FIGS. 21 and 22. A second embodiment differs from the first embodiment in that, in a driver IC 203, select data sets serially inputted to four data input elements 150 to 153 are converted into parallel ones by eight shift registers 210 to 217. Members structured in the same manner as in the first embodiment are denoted by the common reference numerals; and descriptions thereof may properly be omitted.

Figure 21:
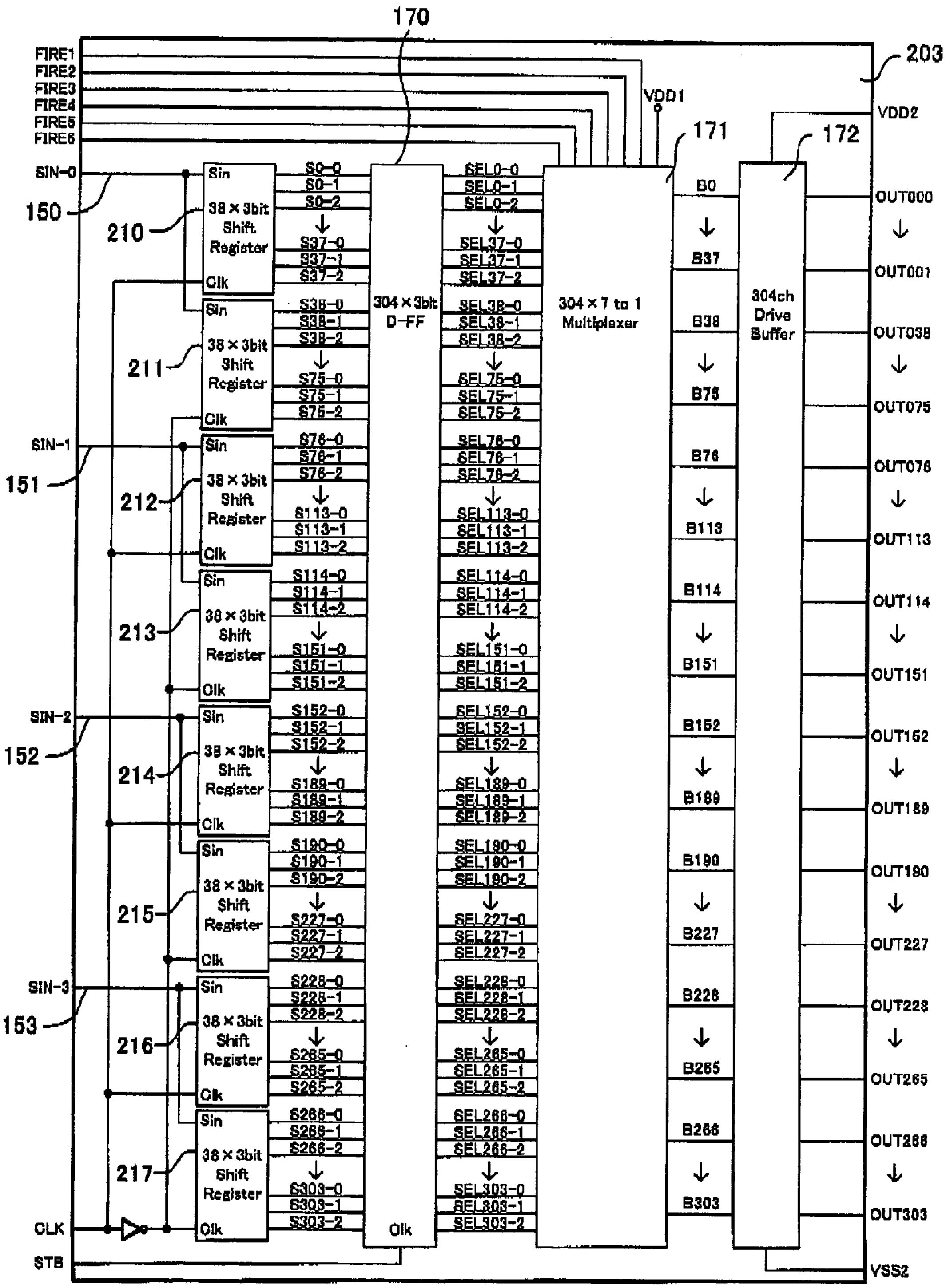
FIG. 21 is a block diagram of a driver IC according to a second embodiment.

As shown in FIG. 21, select data sets for 38 channels are inputted to each of the shift registers 210 to 217. Thus, each shift register 210 to 217 has a bit length of 114 bits (the number of channels (38 channels)×the number of bits included in each select data set (3 bits)). Select data sets are serially inputted to, among the eight shift registers 210 to 217, four shift registers 210, 212, 214, and 216 at a rise timing of a transfer clock CLK which is applied to all the shift registers 210 to 217 in synchronization. Select data sets are serially inputted to the remaining four shift registers 211, 213, 215, and 217 at a fall timing of the transfer clock CLK.

Figure 22:
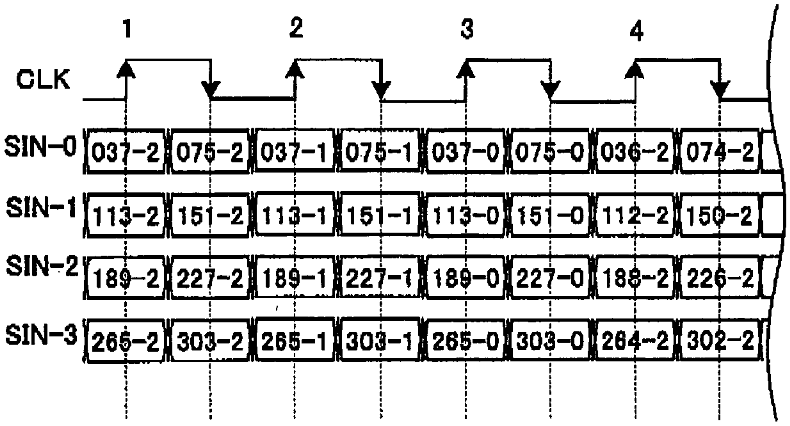
FIG. 22 is a time chart of transmission of select data from a main circuit to the driver IC.

More specifically, as shown in FIG. 22, one bit 037-2 included in a select data set for Ch37, which has been inputted to the select data input 150 through a serial input SIN-0, is inputted to the shift register 210 at a rise timing of a first transfer clock CLK. On the other hand, one bit 075-2 included in a select data set for Ch75, which has been inputted to the select data input 150 through the serial input SIN-0, is inputted to the shift register 211 at a fall timing of the first transfer clock CLK. In the same manner, one bit included in a select data set is inputted to the other shift registers 211 to 217 as well at each of rise and fall timings of every transfer clock CLK.

In the second embodiment thus far described, one bit included in a select data set is inputted to each shift register 210 to 217 at both rise and fall timings of a transfer clock CLK. This enables a frequency of the transfer clock CLK to be reduced by half so that a transmission rate from the main circuit 102 (see FIG. 9) to the driver IC 203 can further be reduced. Thereby, noise emitted from the signal lines 120 to 123 can more effectively be suppressed.

Next, a third embodiment of the present invention will be described with reference to FIGS. 23 and 24. In a third embodiment, a driver IC 303 comprises four shift registers 310 to 313 as in the first embodiment. In the third embodiment, however, the number of channels is 303, which is one below the number of channels of the first embodiment. Members structured in the same manner as in the first embodiment are denoted by the common reference numerals, and descriptions thereof may properly be omitted.

Figure 23:
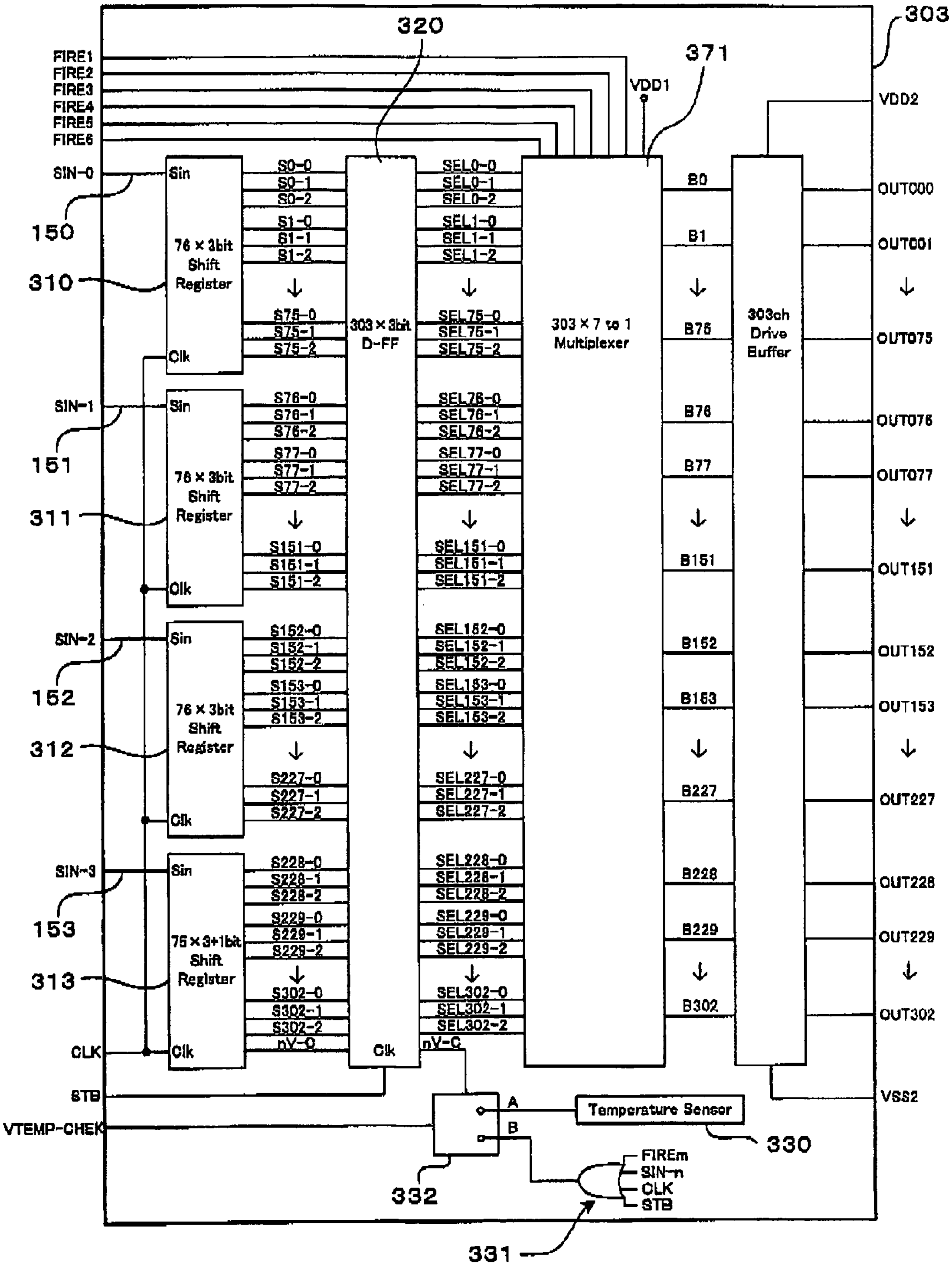
FIG. 23 is a block diagram of a driver IC according to a third embodiment.

As shown in FIG. 23, select data sets for 76 channels are inputted to each of three shift registers 310 to 312 among four shift registers 310 to 313. Thus, each shift register 310 to 312 has a bit length of 228 bits (the number of channels (76 channels)×the number of bits included in each select data set (3 bits)). On the other hand, inputted to the remaining shift register 313 are select data sets for 75 channels and a switch signal nv-C which is one-bit control data set as will be described later. Thus, the shift register 313 has a bit length of 226 bits (the number of channels (75 channels)×the number of bits included in each select data set (3 bits)+1). Data outputted from the four shift registers 310 to 313 in a parallel manner into a D-flip-flop 320 includes 910 bits in total (i.e., 228×3+226), which is one greater than a product of the number of channels and the number of bits included in each select data set (i.e., 303Ch×3 bits=909 bits).

The driver IC 303 includes a temperature sensor 330, a check circuit 331, and a switch circuit 332. The temperature sensor 330 detects a temperature of the driver IC 303. The switch circuit 332 outputs either one of an output (A) from the temperature sensor 330 and an output (B) from the check circuit 331. The check circuit 331 detects whether the main circuit 102 and the driver IC 303 are connected with each other, by checking whether there are normal inputs of waveform signals FIREm (m; any integer between 1 to 6) outputted from the main circuit 102 (see FIG. 9), a serial input SIN-n (n: any integer between 0 to 3) of a select data set, a transfer clock CLK, and a strobe control signal STB. During a manufacturing process of the ink-jet printer, the check circuit 331 confirms only once whether the main circuit 102 and the driver IC 303 are in connection.

Figure 24:
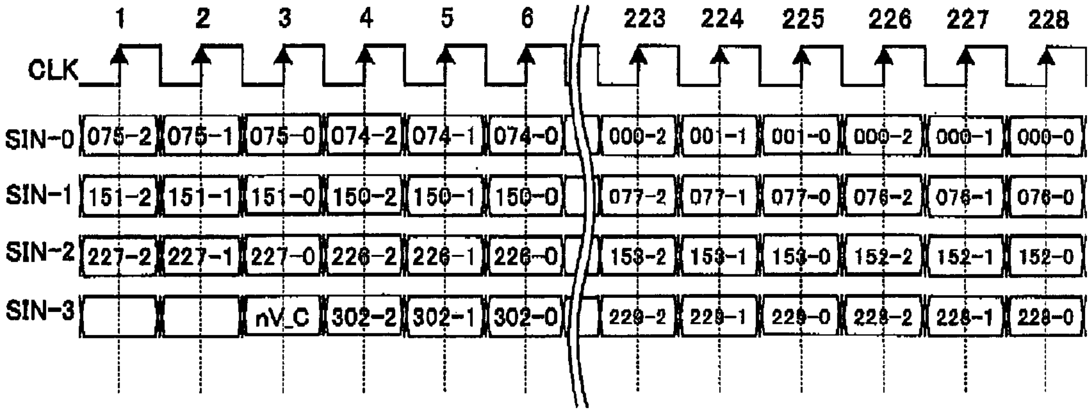
FIG. 24 is a time chart of transmission of select data from a main circuit to the driver IC.

Referring to FIGS. 23 and 24, during the manufacturing process of the ink-jet printer, a high-level switch signal nV-C is inputted from the main circuit 102 through the select data input 153 into the shift register 313. When the high-level switch signal nV-C is, through the D-flip-flop 320, inputted to the switch circuit 332, the switch circuit 332 outputs a signal sent from the check circuit 331 through VTEMP-CHEK into the main circuit 102.

After the connection is confirmed, the switch signal nV-C inputted from the main circuit 102 to the shift register 313 is always kept at a low level. When the low-level switch signal nV-C is inputted from the select data input 153 through the shift register 313 and the D-flip-flop 320 to the switch circuit 332, the switch circuit 332 outputs a signal sent from the temperature sensor 330 through VTEMP-CHEK into the main circuit 102. This means that, after the connection is confirmed, a signal sent from the temperature sensor 330 is always outputted into the main circuit 102. Thus, the main circuit 102 monitors a temperature of the driver IC 303 all the time during the use of the ink-jet printer. When the temperature of the driver IC 303 becomes too high (e.g., 100 degrees C. or higher), the main circuit 102 takes measures to prevent heat from causing failure of the driver IC 303 by, e.g., adjusting a downtime of printing operation.

In the third embodiment thus far described, the signal line 123 (see FIG. 9) for transmitting select data sets can also be used to input, to the shift register 313, the switch signal nV-C that switches between the output (A) from the temperature sensor 330 and the output (B) from the check circuit 331. Accordingly, in order to input the switch signal nV-C to the driver IC 303, it is not necessary to provide a signal line for exclusive use therefor, and therefore cost reduction can be realized.

Control data sets transmissible through the signal line used basically for select data sets include not only the aforementioned switch signal nV-C but also various data sets for controlling a driving operation performed by the driver IC on the ink-jet head as follows. There may be mentioned for example a control data set including a trigger signal that, in order to regularly monitor an output from the temperature sensor 330, outputs a signal sent from the temperature sensor 330 through the VTEMP-CHEK to the main circuit 102 when the trigger signal is inputted. Alternatively, when inputted data comprises not only a signal group including, without the signal VDD1 which indicates no ejection, the six waveform signals FIRE1 to FIRE6 but also another signal group including six waveform signals FIRE1' to FIRE6' which indicate different ejection modes from the signals FIRE1 to FIRE6, the aforesaid control data set may be one including a select signal for selecting either one of these two signal groups. In such a case, ejection modes indicated by two waveform signal groups can properly be selected. In addition, the control data set may be one including a strobe control signal STB which acts as a reference signal for output timing of a select signal.

The number of waveform signals transmitted from the main circuit 102 is not limited to six (FIRE1 to FIRE6). For example, a waveform signal having four pulses may be applied in order to eject ink droplets four times. Also adoptable is a waveform signal including, after one or more pulses for ink ejection, an additional stop pulse for restraining vibration of ink that remains in the nozzles after ink ejections. The number of waveform signals can properly be changed depending on various conditions such as required print quality. Change of the number of waveform signals may sometimes involve change of the number of bits included in each select data set. For example, when nine waveform signals (one of which indicates no ink ejection) are employed, a select data is constituted of four-bit data in order to have one-to-one correspondence with the nine signals.

It is not always necessary that the number of signal lines (which equals the number of select data input elements) through which the select data are transmitted from the main circuit of the printer to the driver IC of the ink-jet head is one greater than the number of bits included in each select data set. The number of signal lines can properly be determined in consideration of costs, a transmission rate of the select data, or the like.

Although the ink-jet head 6 of the above-described embodiments includes a piezoelectric actuator, the present invention is applicable to ink-jet heads that include other actuators such as heaters, diaphragms, etc.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A device for driving a plurality of actuators included in a recording head, comprising:

a plurality of select data input elements to each of which a plurality of select data sets corresponding respectively to the actuators are inputted, the information for each select data set being inputted in a serial manner through a corresponding one of a plurality of signal lines the number of which is the same as the number of the select data input elements, each one of the select data sets indicating which one of a plurality of waveform signals is to be employed for a corresponding one of the actuators in a single printing cycle, each of the waveform signals indicating one of driving modes for the actuators which are different from one another;

a waveform signal selector that selects, for each of the actuators, one of the waveform signals on the basis of a corresponding one of the select data sets inputted to the select data input elements;

a drive signal supplier that, based on a waveform signal selected by the waveform signal selector, supplies a drive signal to each of the actuators which is driven according to the drive signal to conduct recording on a record medium; and a plurality of converters that convert the plurality of select data sets, which are inputted to the plurality of select data input elements in a serial manner, into parallel ones;

wherein the number of the select data input elements is greater than the number of bits included in each of the select data sets, the number of bits included in each of the select data sets being the number capable of representing all of the waveform signals.

2. The device according to claim 1;

wherein the number of select data input elements is one greater than the number of bits included in each of the select data sets.

3. The device according to claim 1;

wherein a plurality of bits included in each of the select data sets are sequentially inputted to the converters in a serial manner.

4. The device according to claim 3;

wherein the actuators are classified into a plurality of color-based actuator groups that correspond respectively to a plurality of colors employed in the recordings; and wherein bits included in a plurality of select data sets corresponding to a plurality of actuators that belong to the same color-based actuator group are inputted in a serial manner at the same timing in a predetermined order of colors.

5. The device according to claim 4;

wherein the same timing is either one of a rise timing and a fall timing of clock signals that are applied to the converters in synchronization with one another.

6. The device according to claim 1;

wherein bits included in the select data sets are inputted to a part of the converters at a rise timing of clock signals that are applied to the converters in synchronization with one another, and inputted to the rest of the converters at a fall timing of the clock signals.

7. The device according to claim 1;

wherein the total number of bits included in data which is outputted from the converters in a parallel manner is greater than a product of the number of the actuators and the number of bits included in each of the select data sets;

wherein the select data sets alone are inputted to a part of the converters; and wherein one or more select data sets and in addition a control data set for controlling the driving mode are inputted to the rest of the converters.

8. A recording apparatus comprising a recording head including a plurality of actuators, a device for driving the actuators, and a main circuit;

wherein the main circuit contains:

a waveform signal generator that generates a plurality of waveform signals, each of the waveform signals indicating one of driving modes for the actuators which are different from one another;

a distributor that distributes a plurality of pixel data sets corresponding to the actuators into a plurality of groups on a pixel-data-set basis, each one of the pixel data sets indicating which gradation value is to be employed for a corresponding one of the actuators in a single printing cycle;

a plurality of select data generators that correspond to the groups respectively and generate, on the basis of the pixel data sets, a plurality of select data sets each including such a number of bits as adequate to indicate the waveform signals respectively, each one of the select data sets indicating which one of the waveform signals is to be employed for a corresponding one of the actuators in a single printing cycle; and a transmitter that includes a plurality of signal lines through which the select data sets are transmitted to the device, the number of the signal lines being the same as the number of the groups so that the signal lines connect the select data generators with the device for each of the groups;

wherein the device contains:

a plurality of select data input elements to each of which the select data sets are inputted, the information for each select data set being inputted in a serial manner through a corresponding one of the signal lines;

a waveform signal selector that selects, for each of the actuators, one of the waveform signals on the basis of a corresponding one of the select data sets inputted to the select data input elements; and a drive signal supplier that, based on a waveform signal selected by the waveform signal selector, supplies a drive signal to each of the actuators which is driven according to the drive signal to conduct recording on a record medium; and wherein the number of the signal lines is greater than the number of bits included in each of the select data sets, the number of bits included in each of the select data sets being the number capable of representing all of the waveform signals.

* * * * *